US012675341B2

(12) United States Patent
Aurongzeb et al.

(10) Patent No.: US 12,675,341 B2
(45) Date of Patent: Jul. 7, 2026

(54) SYSTEM AND METHOD FOR PREEMPTIVELY ADJUSTING FORECASTED MEMORY ACCESS WORKLOAD TO MINIMIZE DATA CENTER CARBON FOOTPRINT

(71) Applicant: Dell Products, LP, Round Rock, TX (US)

(72) Inventors: Deeder M. Aurongzeb, Austin, TX (US); Ramesh Doddaiah, West Borough, MA (US); Malathi Ramakrishnan, Madurai (IN)

(73) Assignee: DELL PRODUCTS LP, Round Rock, TX (US)

( * ) Notice: Subject to any disclaimer, the term of this patent is extended or adjusted under 35 U.S.C. 154(b) by 468 days.

(21) Appl. No.: 18/136,598

(22) Filed: Apr. 19, 2023

(65) Prior Publication Data

US 2024/0354172 A1      Oct. 24, 2024

(51) Int. Cl.
*G06F 9/50* (2006.01)

(52) U.S. Cl.
CPC .................................. *G06F 9/5088* (2013.01)

(58) Field of Classification Search
CPC .... G06F 9/5088; G06F 3/0653; G06F 9/5094; G06F 3/067; G06F 11/3442
See application file for complete search history.

(56) References Cited

U.S. PATENT DOCUMENTS

| | | | | |
|---|---|---|---|---|
| 8,185,909 | B2 | 5/2012 | Sigal | |
| 8,626,450 | B2 | 1/2014 | Dooley | |
| 9,183,327 | B2 | 11/2015 | Keeli | |
| 9,519,522 | B1 * | 12/2016 | Phadke | ................ G06F 3/0631 |

(Continued)

FOREIGN PATENT DOCUMENTS

| | | |
|---|---|---|
| EP | 2006770 B1 | 1/2014 |
| WO | 2011/106160 A2 | 9/2011 |

OTHER PUBLICATIONS

C. Herrmann, et al., "Sustainability as Strategic Business Model for Profitable Business," 7 pages, May 2014.

(Continued)

*Primary Examiner* — Jorge A Chu Joy-Davila
(74) *Attorney, Agent, or Firm* — Prol Intellectual Property Law, PLLC; H. Kenneth Prol

(57) ABSTRACT

An information handling system executing a predictive task adjusting and carbon dioxide (CO2) minimizing system may comprise a hardware processor executing code instructions of a time series forecasting engine to predict a future CO2 emissions value for hardware component within a data center within a future time window that exceeds a CO2 threshold value determined for the hardware component where changes in CO2 emissions are due to a forecasted future load of memory accessing functions causing a change in energy consumption, the hardware processor executing code instructions to identify an adjusted forecasted future load of memory accessing functions whose execution is predicted to decrease CO2 emitted during the future time window below the CO2 threshold value, and the network interface device to transmit a workload redistribution instruction for implementing the adjusted forecasted future load of memory accessing functions at the data center.

20 Claims, 7 Drawing Sheets

(56)                    References Cited

U.S. PATENT DOCUMENTS

| | | | |
|---|---|---|---|
| 9,760,474 B2 | 9/2017 | Pillai | |
| 10,521,399 B1 * | 12/2019 | Ben-Tsion | G06F 3/0608 |
| 2004/0024861 A1 | 2/2004 | Coughlin | |
| 2008/0046895 A1 | 2/2008 | Dillenberger | |
| 2009/0276388 A1 | 11/2009 | Donohue | |
| 2009/0292617 A1 | 11/2009 | Sperling | |
| 2010/0070404 A1 | 3/2010 | McConnell | |
| 2014/0100937 A1 | 4/2014 | Na | |
| 2014/0181834 A1 | 6/2014 | Lim | |
| 2014/0316964 A1 | 10/2014 | Slutsker | |
| 2017/0123857 A1 | 5/2017 | Khan | |
| 2021/0004328 A1 | 1/2021 | Wang | |
| 2021/0127125 A1 * | 4/2021 | Fruchter | H04N 19/51 |
| 2021/0208781 A1 * | 7/2021 | Chen | G06F 3/0604 |
| 2021/0373973 A1 * | 12/2021 | Ekins | G06F 9/5088 |
| 2024/0134643 A1 * | 4/2024 | Antinori | G06F 8/77 |

OTHER PUBLICATIONS

A. Stenhall, "What is the carbon footprint of a typical corporate laptop?," 6 pages, Oct. 25, 2020.
K. Abnett, et al., "EU proposes world's first carbon border tax for some imports," 14 pages, Jul. 14, 2021.

* cited by examiner

*FIG. 4*

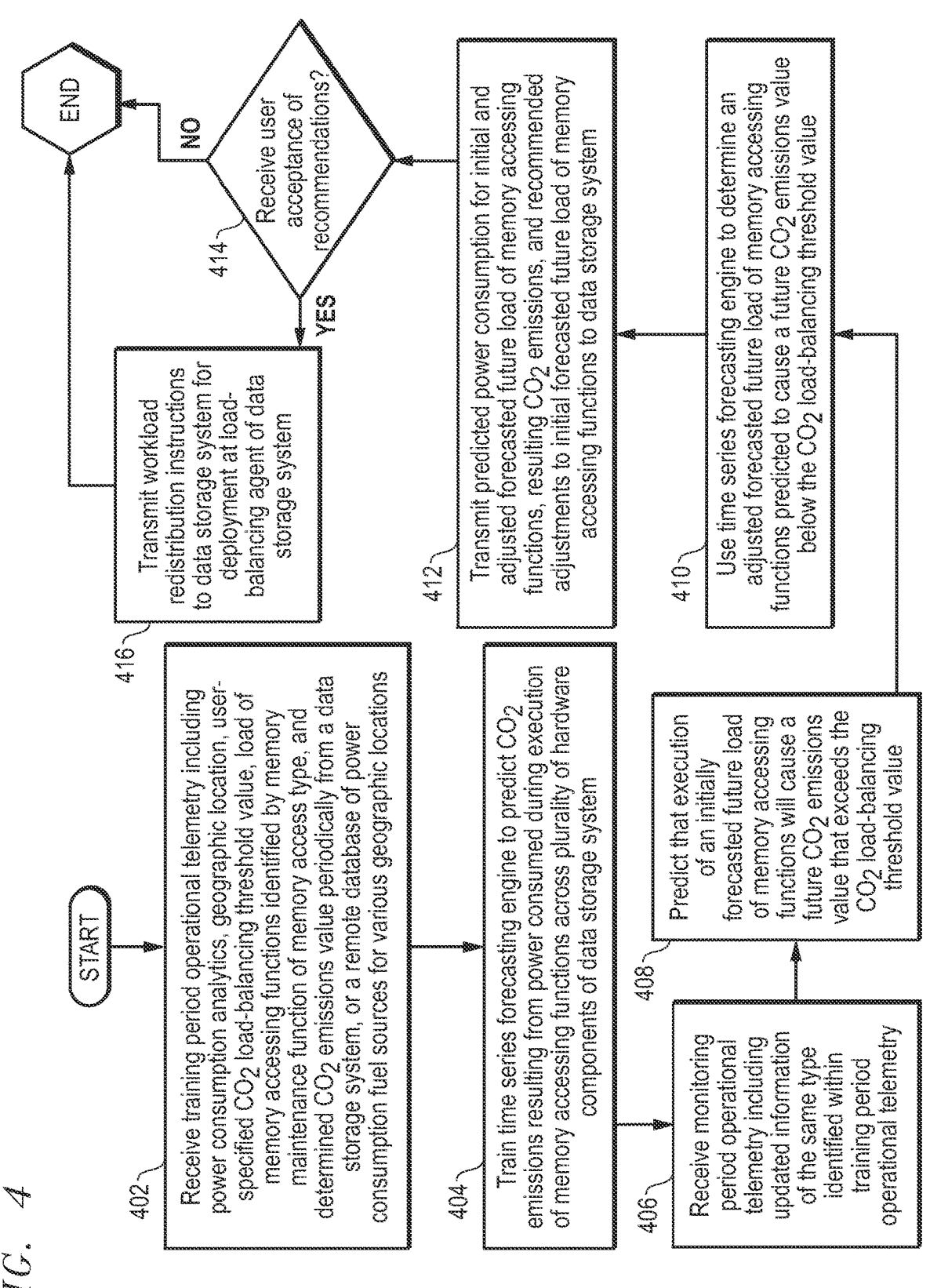

402 — Receive training period operational telemetry including power consumption analytics, geographic location, user-specified $CO_2$ load-balancing threshold value, load of memory accessing functions identified by memory maintenance function of memory access type, and determined $CO_2$ emissions value periodically from a data storage system, or a remote database of power consumption fuel sources for various geographic locations 404 — Train time series forecasting engine to predict $CO_2$ emissions resulting from power consumed during execution of memory accessing functions across plurality of hardware components of data storage system 406 — Receive monitoring period operational telemetry including updated information of the same type identified within training period operational telemetry 408 — Predict that execution of an initially forecasted future load of memory accessing functions will cause a future $CO_2$ emissions value that exceeds the $CO_2$ load-balancing threshold value 410 — Use time series forecasting engine to determine an adjusted forecasted future load of memory accessing functions predicted to cause a future $CO_2$ emissions value below the $CO_2$ load-balancing threshold value 412 — Transmit predicted power consumption for initial and adjusted forecasted future load of memory accessing functions, resulting $CO_2$ emissions, and recommended adjustments to initial forecasted future load of memory accessing functions to data storage system 414 — Receive user acceptance of recommendations?

NO — END

YES

416 — Transmit workload redistribution instructions to data storage system for deployment at load-balancing agent of data storage system

START

*FIG. 6*

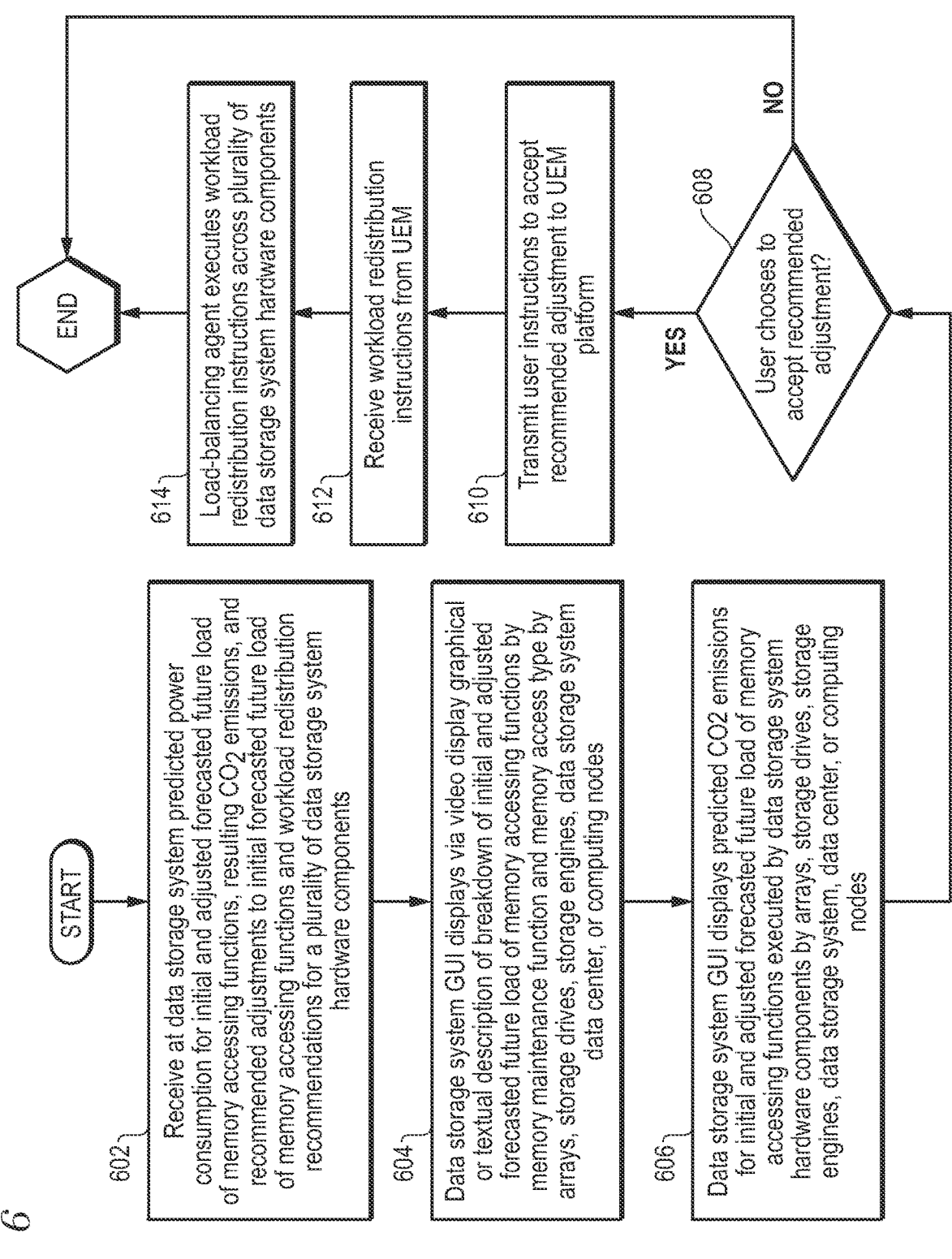

602 — Receive at data storage system predicted power consumption for initial and adjusted forecasted future load of memory accessing functions, resulting $CO_2$ emissions, and recommended adjustments to initial forecasted future load of memory accessing functions and workload redistribution recommendations for a plurality of data storage system hardware components 604 — Data storage system GUI displays via video display graphical or textual description of breakdown of initial and adjusted forecasted future load of memory accessing functions by memory maintenance function and memory access type by arrays, storage drives, storage engines, data storage system data center, or computing nodes 606 — Data storage system GUI displays predicted $CO_2$ emissions for initial and adjusted forecasted future load of memory accessing functions executed by data storage system hardware components by arrays, storage drives, storage engines, data storage system, data center, or computing nodes 608 — User chooses to accept recommended adjustment?

610 — Transmit user instructions to accept recommended adjustment to UEM platform 612 — Receive workload redistribution instructions from UEM 614 — Load-balancing agent executes workload redistribution instructions across plurality of data storage system hardware components

END

YES

NO

SYSTEM AND METHOD FOR PREEMPTIVELY ADJUSTING FORECASTED MEMORY ACCESS WORKLOAD TO MINIMIZE DATA CENTER CARBON FOOTPRINT

FIELD OF THE DISCLOSURE

The present disclosure generally relates to minimizing an amount of greenhouse gas emissions that may be attributable to operation of an information handling system. More specifically, the present disclosure relates to a predictive task adjusting and carbon dioxide ($CO_2$) minimizing system for preemptively suggesting adjustments to a forecasted future workload across various hardware components executing memory accessing function within an enterprise data storage system, which may comprise one or more data centers, to minimize $CO_2$ emissions due to operation of such hardware components.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, data centers, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4 is a flow diagram illustrating a method of training and using a time series forecasting engine for preemptively avoiding high $CO_2$ emissions due to future memory accessing workloads according to an embodiment of the present disclosure;

FIG. 6 is a flow diagram illustrating a method of generating forecasted future memory access function workloads and recommendations for decreasing causative $CO_2$ emissions according to an embodiment of the present disclosure.

The use of the same reference symbols in different drawings may indicate similar or identical items.

DETAILED DESCRIPTION OF THE DRAWINGS

Figure 1:
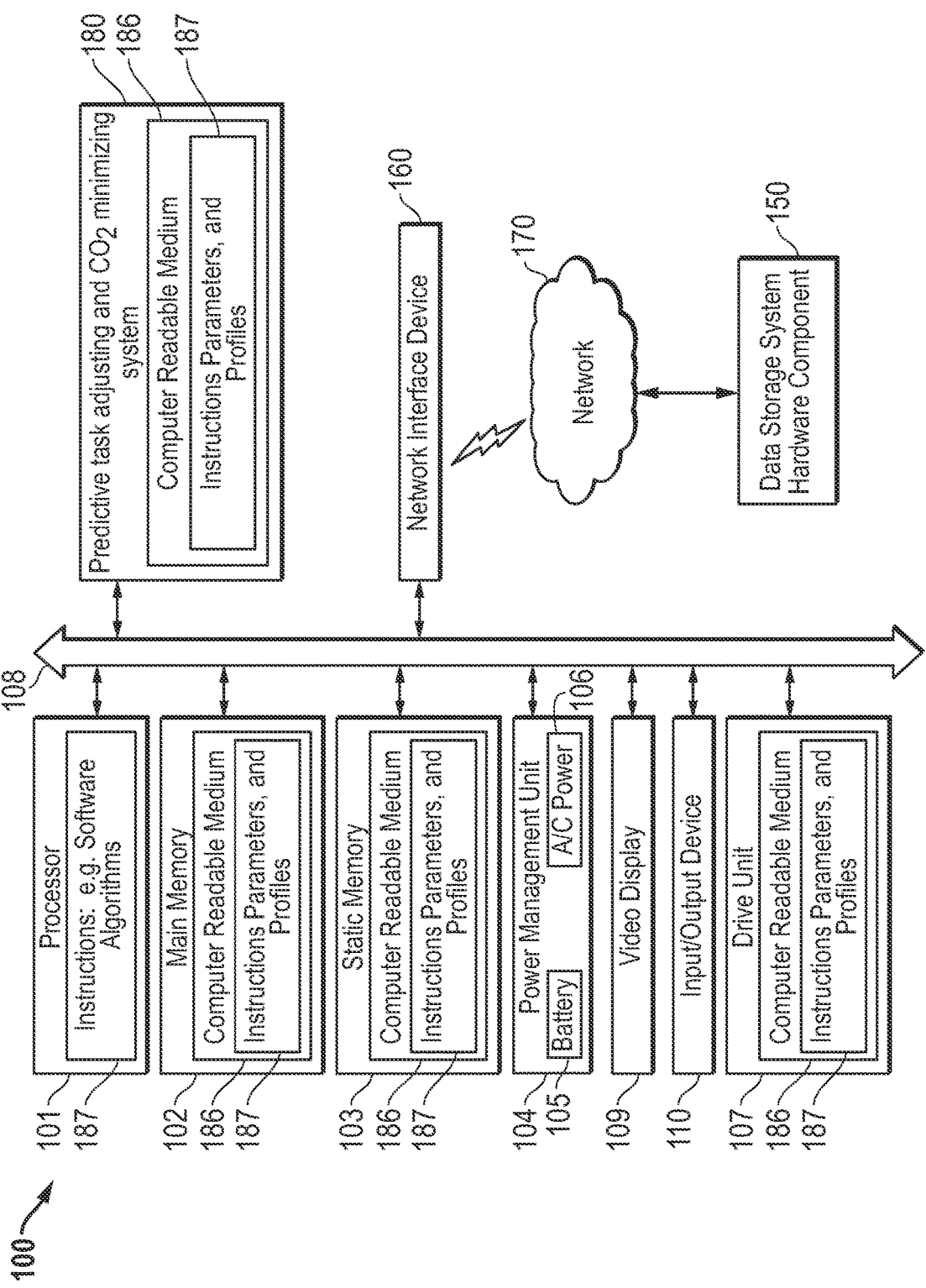
FIG. 1 is a block diagram illustrating a cloud-based Unified Endpoint Management (UEM) platform information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Load-balancing of processing requests across enterprise data storage systems (e.g., including one or more data centers) comprising a plurality of hardware components executing memory accessing functions (e.g., servers) and across several time windows is essential to efficient operation of server farms, or data centers for cloud computing providers, data storage, and for customers. Client information handling systems (e.g., host computers) serviced by such enterprise systems often access many different data storage systems (e.g., one or more data centers), or portions thereof (e.g., specific servers) in various locations within one or more geographic regions (e.g., within the United States, Europe, the Europe, Middle East, Africa (EMEA) region, or globally). A data storage system in embodiments of the present disclosure may comprise one or more data centers, and each data center within a data storage system may be located in a different geographic area than other data centers. Many systems exist for optimizing distribution of memory accessing functions or processing requests across a plurality of such data centers located in various places around the world in order to maximize the speed, efficiency, or throughput (e.g., number of calls processed within a set period of time) of the overall enterprise system or across all hardware components of an enterprise data storage system, referred to herein as data storage system/data center(s). However, a system for distributing such functionality so as to minimize carbon dioxide ($CO_2$) or other greenhouse gas (GHG) emissions is needed.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. Further, such emissions may also influence a cloud computing customer's selection of cloud-based computing resources, including various hardware components within data storage system/data center(s), such as servers, computing nodes, storage engines, storage arrays, fabric connections, or managed drives operated within one or more data centers for a larger enterprise system. GHGs emitted by any given hardware component of the data storage system/data center(s) within an enterprise network may be dependent upon power consumed during operation of the hardware component, timing of such operations within a 24 hour cycle, and geographic location of the hardware component. For example, data storage system/data center(s) hardware components may cause the emission of GHGs by consuming power delivered by power sources that burn fossil fuels, or capture more environmentally friendly solar, wind, or water power. The type of power plant providing such power for consumption by the data storage system/data center(s) hardware components, and consequently, the GHGs emitted during consumption of power may depend upon the geographic location at which such power is consumed and the time of day at which such power is consumed. The amount of GHGs emitted during production of each kilowatt-hour (kWh) of power may vary greatly dependent upon the time of day or whether the power station or other power source supplying such power is undergoing a spike in consumption. For example, in many locations, consumption of power provided by more environmentally friendly power sources (e.g., hydroelectric, wind, solar, etc.) may be prioritized. In such cases, when the power consumption for a source spikes and exceeds the power available from those environmentally friendly power sources, the station or source may make power generated through less environmentally friendly methods (e.g., burning of fossil fuels) available to address the surge in demand. Thus, during such peak consumption time windows, the overall carbon footprint for power consumed from that station or source may increase drastically.

The predictive task adjusting and carbon dioxide ($CO_2$) minimizing system in embodiments of the present disclosure address this issue by determining an optimal distribution of memory accessing functions across a plurality of data storage system/data center(s) hardware components over time so as to minimize $CO_2$ emissions. In embodiments of the present disclosure, a unified endpoint management (UEM) platform managing a plurality of such data storage system/data center(s) hardware components may train a time series forecasting engine to predict $CO_2$ emissions resulting from power consumed during execution of various memory accessing functions across that plurality of data storage system/data center(s) hardware components. The UEM platform may train the engine based on operational telemetry measurements describing the load of memory accessing functions by type (e.g., read, write, compression rate, decompression rate, deduplication rate), and by memory maintenance function (e.g., encryption, snapshot, backup, replication) as executed at each of the data storage system/data center(s) hardware components within a node, array, storage drive, or entire data center, for example. A $CO_2$ optimization engine operating at the UEM platform may further identify a determined $CO_2$ emissions value for each of these memory accessing types and memory maintenance functions, based on the carbon footprint associated with the power station or other source supplying power consumed during such execution at a given data center. As described above, this carbon footprint may vary based on geographic location and type of power supplied at any given time (e.g., solar, wind, hydro-electric, fossil fuel burning, etc.). The determined $CO_2$ emissions value associated with each recorded memory access type and memory maintenance function in embodiments may consequently also vary with the time of such execution.

The time series forecasting engine in embodiments of the present disclosure may model a relationship between previously recorded and collected changes in $CO_2$ emissions values and changes in load of memory accessing functions across a plurality of data storage system/data center(s) hardware components within an enterprise computing node, array, storage group, or data center, for example. Once the time series forecasting engine is fully trained to provide such a model, the engine may be used at the UEM platform to predict a future time window in which execution of a forecasted future load of memory accessing functions will cause future $CO_2$ emissions that exceed a user-specified $CO_2$ load-balancing threshold value. For example, a managing user may specify that $CO_2$ emissions values should not exceed an average $CO_2$ emissions value by more than a certain percentage (e.g., 10%, 20%, 200%). The time series forecasting engine may identify such future time windows in which the planned or expected routine execution of such memory accessing functions will likely cause a carbon footprint exceeding the user-specified $CO_2$ emissions value, for example, if the forecasted workload for that time window increases markedly above an average workload, or if the workload for that time window is expected to occur during peak consumption hours for that power station or source or region, causing the power station or source to begin burning fossil fuels in order to address the surge in demand.

Once a future time window is identified in which the planned or expected routine execution of such memory accessing functions will likely cause a carbon footprint exceeding the user-specified $CO_2$ emissions value in embodiments of the present disclosure, the time series forecasting engine may be trained to model a relationship between $CO_2$ emissions and various characteristics of monitored workloads to identify adjustments to the expected workload for that time window that may decrease the carbon footprint for execution of that workload. An example time series forecasting engine in embodiments herein may use an autoregressive integrated moving average (AMIRA) method to correlate memory access types (e.g., read/write compression/decompression of varying rates, de-duplication of varying rates) or memory maintenance functions (e.g., replications, backups, snapshots, encryption) to an amount of $CO_2$ emitted during execution of these memory accesses or memory maintenance functions. For example, the time series forecasting engine may be used at the UEM platform to forecast whether various adjustments to memory access types (e.g., altered rate of read/write compression, decompression, deduplication) and memory maintenance functions (e.g., altered frequency of maintenance such as replications, backups, snapshots, encryption tasks) during the upcoming time window may decrease the predicted $CO_2$ emissions value associated with that workload below the user-specified $CO_2$ load-balancing threshold value. More specifically, the time series forecasting engine may forecast whether decreasing the compression, decompression, or deduplication rates for expected read or writes to memory of the data storage system/data center(s) during the upcoming time window may decrease the associated carbon footprint below the user-specified $CO_2$ load-balancing threshold value. In another example, the time series forecasting engine may forecast whether decreasing the frequency of certain memory maintenance functions such as encryption, snapshots, replication, and backups for memories of the data storage system/data center(s) during the upcoming time window may decrease the associated carbon footprint below the user-specified $CO_2$ load-balancing threshold value. In some cases, the time series forecasting engine may identify a plurality of such adjustments that may be made in order to decrease the carbon footprint below the user-specified $CO_2$ load-balancing threshold value. In embodiments of the present disclosure, once such an adjustment or combination of adjustments to the predicted future workload are identified as likely to decrease the $CO_2$ emissions value, the UEM platform may transmit a recommendation to a management terminal at the data storage system/data center(s) to employ the recommended adjustments during the upcoming time window in order to minimize $CO_2$ emissions during that upcoming time window.

A graphical user interface (GUI) operating at a management terminal of the data storage system/data center(s) may receive such recommendations from the UEM platform and display graphics in support of such recommendations. For example, such a GUI in various embodiments described herein may display a predicted workload and resulting carbon footprint forecasted by the time series forecasting engine to occur during the upcoming time window in which the carbon footprint is expected to exceed the user-specified $CO_2$ load-balancing threshold value. As another example, the GUI in embodiments may also display graphics indicating how the recommended adjustments to that workload may decrease the carbon footprint forecasted to occur during the upcoming time window below the user-specified $CO_2$ load-balancing threshold value. The GUI in embodiments may allow the managing user to select one or more suggested recommendations to adjust the workload on the plurality of data storage system/data center(s) hardware components to be executed during that upcoming time window in order to decrease the carbon footprint below the $CO_2$ load-balancing threshold value. Upon managing user selection of one or more such recommendations, the GUI at the management terminal of the data storage system/data center(s) may transmit acceptance of specifically identified recommendations to the UEM platform, which may return a workload redistribution instruction for execution of the user-selected adjustments at the plurality of data storage system/data center(s) hardware components during the upcoming time window. In such a way, the predictive task adjusting and $CO_2$ minimizing system, including the time series forecasting engine may preemptively recommend adjustments to workloads expected to cause high carbon footprints during future time windows in order to limit or avoid $CO_2$ emissions values forecasted to exceed a user-specified $CO_2$ load-balancing threshold value.

FIG. 1 illustrates an information handling system 100 according to several aspects of the present disclosure. As described herein, an information handling system 180 may execute code instructions of a predictive task adjusting and $CO_2$ minimizing system 180 operating at a Unified Endpoint Management (UEM) platform information handling system to preemptively suggest adjustments to a forecasted future workload of memory accessing functions across a plurality of hardware components of a data storage system/data center(s) executing memory accessing functions (e.g., including 150) so as to minimize $CO_2$ emitted during execution of such a workload across all data storage system/data center(s) hardware components executing memory accessing functions (e.g., 150) of the enterprise system. Some or all of portions and components information handling system 100 in FIG. 1 may also represent one or more portions of a data storage system/data center(s) (e.g., computing nodes or storage engines as described in greater detail below with respect to FIG. 2) according to embodiments herein, also shown at as data storage system/data center(s) hardware components 150, and information handling system 100 may also serve as a UEM platform device, or a data storage system/data center(s) managing the data storage system/data center(s) hardware components 150, according to various embodiments herein. Data storage system/data center(s) hardware components operational telemetry measurements including power analytics, a geographic location for the various data storage system/data center(s) hardware components, a user-specified $CO_2$ load-balancing threshold value, a load of memory accessing functions, as well as determined $CO_2$ emissions values particular to each data storage system/data center(s) hardware components (e.g., 150) may be gathered during routine monitoring periods from a plurality of data storage system/data center(s) hardware components (e.g., 150), and the data storage system/data center(s) managing such components 150 to the UEM platform 100 executing the predictive task adjusting and $CO_2$ minimizing system 180. Power consumption levels for data storage system/data center(s) hardware components including information handling systems 100 operating as compute nodes, storage arrays, or other components at one or more data centers may be measured and reported by a power management unit (PMU) 104 and provided in correlation with memory accessing functions being executed according to embodiments herein. PMU 104 may include a power management controller or other processor to monitor power consumption levels by data storage system/data center(s) hardware components and report that with correlation to executing memory accessing functions according to embodiment of the present disclosure. Other operational telemetry, such as processor or memory function including executed memory accessing functions may be reported as well by the data storage system/data center(s) hardware components. Some or all of the information handling system 100 of FIG. 1 may operate at a UEM platform information handling system or as a portion of a data storage system/data center(s) according to various embodiments herein. The UEM platform 100 in an embodiment may manage the type and frequency of memory accessing functions executed across a plurality of data storage system/data center(s) hardware components over time so as to minimize $CO_2$ emissions due to power consumed by those data storage system/data center(s) hardware components, based on geographic location of the data storage system/data center(s).

Using these operational telemetry measurements from a plurality of data storage system/data center(s) hardware components (e.g., 150), and $CO_2$ emissions values, the predictive task adjusting and $CO_2$ minimizing system 180 executing on a hardware processor 101 in embodiments herein may use a time series forecasting engine modelling a relationship between changes in $CO_2$ emissions values and changes in data storage system/data center(s) hardware component operational telemetry measurements to predict, for each of the plurality of data storage system/data center(s) hardware components (e.g., 150), a load of memory accessing functions forecasted to execute at a data storage system/data center(s) hardware component (e.g., 150) during a future time window in which that data storage system/data center(s) hardware component (e.g., 150) is also forecasted to emit CO2 at or above a maximum CO2 threshold value specific to that data storage system/data center(s) hardware component (e.g., 150). Upon detecting that the data storage system/data center(s) hardware component 150 is predicted to cause CO2 emissions above the user-specified CO2 load-balancing threshold, the predictive task adjusting and CO2 minimizing system in an embodiment may determine and transmit to a management terminal at the data storage system/data center(s) one or more suggested adjustments that may be made to the forecasted future workload to avoid CO2 emissions to exceed the user-specified maximum value.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit (PMU) 104 supplying power to the information handling system 100, via a battery 105 or an alternating current (A/C) power adapter 106 may supply power to one or more components of the information handling system 100, including the hardware processor 101, or other hardware processing resources executing code instructions of the predictive task adjusting and CO2 minimizing system 180, the wireless network interface device 160, a static memory 103 or drive unit 107, a, a video display 109, or other components of an information handling system. The PMU 104 may also include a controller to measure and report power consumption by one or more components of an information handling system such as the data storage system/data center(s) hardware components 150. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, such as for the predictive task adjusting and CO2 minimizing system 180, that may operate on servers or systems, remote data centers, or on-box in individual data storage system/data center(s) hardware components 150 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Such a hardware processor 101 in an embodiment may be referred to herein as a "local" processor, as it is "local" to the UEM platform of which the information handling system 100 may comprise all or a part. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing a predictive task adjusting and CO2 minimizing system 180, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 170. Further, the instructions 187 may be transmitted or received over the network 170 via the network interface device 160. The information handling system 100 may include a set of instructions 187 that may be executed to preemptively suggest adjustments to a forecasted future workload of memory accessing functions across a plurality of data storage system/data center(s) hardware components (e.g., including 150) so as to minimize CO2 emitted during execution of such a workload across all data storage system/data center(s) hardware components (e.g., 150) of the enterprise system. For example, instructions 187 may include a particular example of a predictive task adjusting and CO2 minimizing system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The predictive task adjusting and CO2 minimizing system 180 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the predictive task adjusting and CO2 minimizing system 180, firmware or software algorithms, processes, and/or methods may be stored here. Such code instructions 187 may comprise forecasting a future memory access workload across a plurality of data storage system/data center(s) hardware components predicted to cause CO2 emissions exceeding a maximum level and to preemptively suggest adjustments to the forecasted future workload so as to minimize CO2 emitted. The predictive task adjusting and CO2 minimizing system 180 may operate on hardware processing resources within a Unified Endpoint Management (UEM) platform 100 that gathers telemetries from a plurality of data storage system/data center(s) hardware components (e.g., 150) via the network 170 that describe operating environments for those data storage system/data center(s) hardware components (e.g., 150). The UEM platform 100 in an embodiment may operate to identify information technology (IT) issues at data storage system/data center(s) hardware components 150, and to provide support for such issues, including automatically updating drivers or hardware components, as needed. The UEM platform in an embodiment may operate as a cloud-based service to store data (e.g., operating environment telemetries for remote data storage system/data center(s) hardware components 150) within memory 102, static memory 103, or computer-readable medium 186 received via network 170. In some embodiments the information handling system 100 may be a server executing a UEM platform.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the predictive task adjusting and CO2 minimizing system 180 may be stored in static memory 103, or the drive unit 107 on a computer-readable medium 186 such as a flash memory or magnetic disk in an example embodiment. More specifically, telemetries describing power consumption and workloads for data storage system/data center(s) hardware components (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® Core class hardware processor, ARM @brand hardware processors, Qualcomm® hardware processors, or other hardware processors and chipsets, or other such device, or software capable of operating a relevant environment of the information handling system. The hardware system, hardware device, hardware controller, or hardware module may also comprise a combination of the foregoing examples of hardware, hardware processors, or controllers executing firmware or software. In an embodiment an information handling system 150 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
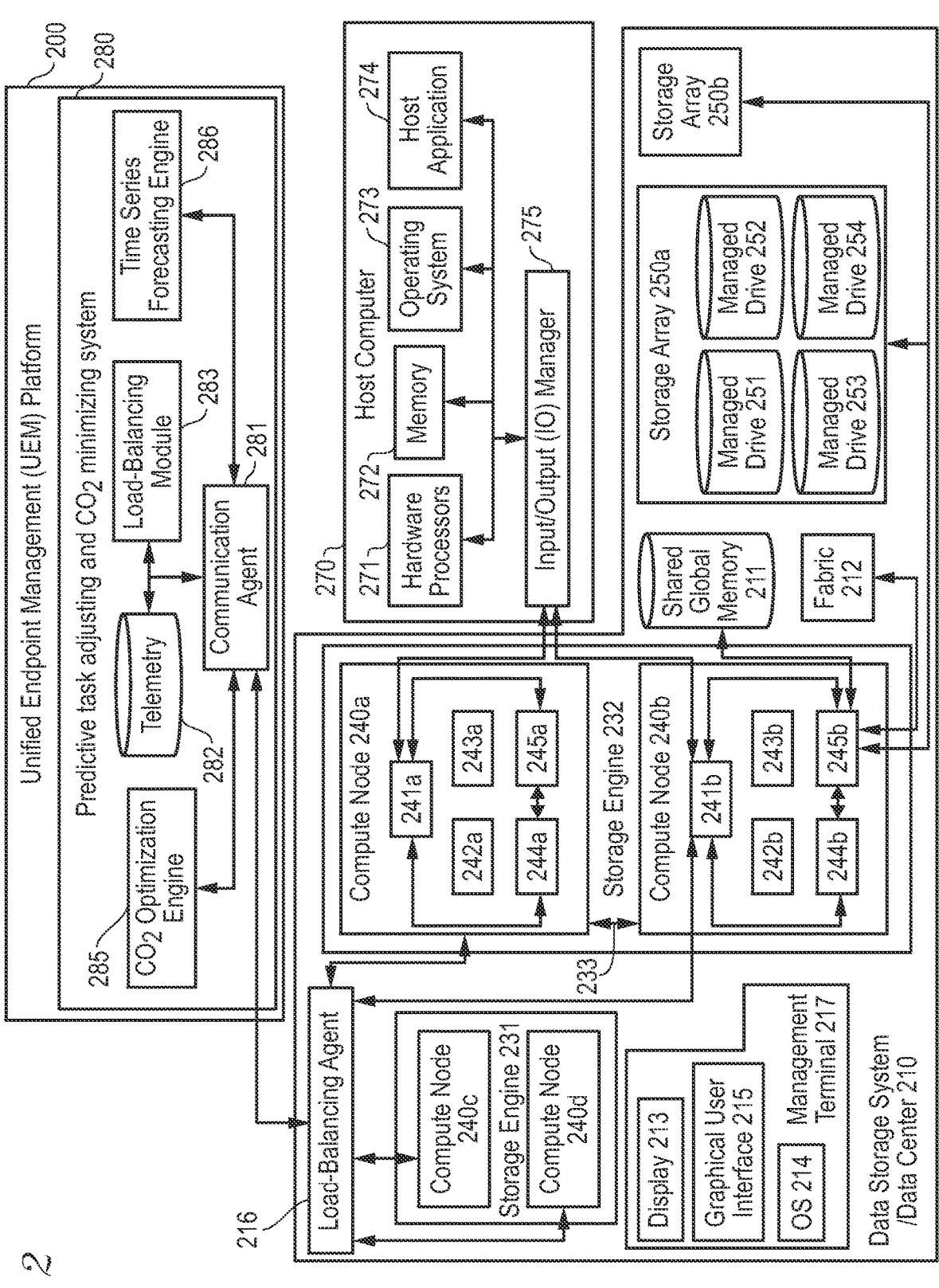
FIG. 2 is a block diagram illustrating a predictive task adjusting and carbon dioxide ($CO_2$) minimizing system executing on a UEM information handling system to manage an enterprise data storage system with one or more data center(s) according to an embodiment of the present disclosure.

FIG. 2 is a block diagram illustrating a predictive task adjusting and carbon dioxide ($CO_2$) minimizing system 280 for preemptively suggesting adjustments to a forecasted future workload of memory accessing functions across a plurality of storage locations within a data storage system/data center(s) 210 so as to minimize $CO_2$ emitted during execution of such a workload across all storage locations of the enterprise system data storage system 210, at various geographic locations. Such a preemptive workload adjusting method may be triggered upon forecasting that the data storage system 210 is likely to execute a workload of memory accessing functions that will cause $CO_2$ emissions exceeding a user-specified $CO_2$ load-balancing threshold value. As described herein, a data storage system 210 in various embodiments herein may comprise one or more data centers, and each data center within a data storage system having multiple data centers may be located in a different geographic area than other data centers. Each data center (e.g., 210) in an example embodiment may comprise at least one compute node (e.g., 240a), a load-balancing agent 216, a management terminal 217, and at least one storage array 250a. These data storage system hardware components each may be explained in greater detail below.

In an embodiment, the data storage system/data center(s) 210 may provide data storage services for a plurality of host computers (e.g., 270), which may act as client information handling systems within an enterprise system. The host computer 270 in an embodiment may comprise one or more hardware processors 271, a local-to-host memory 272, an operating system 273, and one or more host applications 274. The processor(s) 271 in an embodiment may comprise one or more multi-core processors including central processing unit (CPU), graphics processing unit (GPU), or combinations thereof. The local-to-host memory 272 in an embodiment may include volatile memory (e.g., Random Access Memory (RAM) of any type), or tangible persistent storage components of one or more technology types (e.g., Solid State Drives (SSDs), Hard Disk Drives (HDDs), Storage Class Memory (SCM), Enterprise Flash Drives (EFDs), Serial Advanced Technology Attachment (SATA) drives, or Fiber Channel (FC) drives. The host computer 270 in an embodiment may support multiple virtual hosts running on virtual machines or containers. In some embodiments, host computer 270 may be implemented as a virtual machine within storage system 210.

In an embodiment, the host application 274 may comprise any type of software directing the processor 271 to access data stored in memory either locally (e.g., at 272 comprising volatile memory or persistent storage), or within the data storage system/data center(s) 210. More specifically, host application 273 in an example embodiment may include file servers, e-mail servers, block servers, software development testbeds, or databases. The data storage system/data center(s) 210 in an embodiment may maintain data for the host application 274 running on the host computer 270. For example, host application 274 may write data of the host application 274 to the data storage system/data center(s) 210 and read data of host application 274 from the data storage system/data center(s) 210, via an input/output (IO) manager 275, in order to perform various functions.

The data storage system/data center(s) 210 in an embodiment may comprise one or more storage engines (e.g., 231 or 232), which may each further comprise one or more compute nodes 240a, 240b, 240c, or 240d, possibly including but not limited to storage servers and storage directors for providing data storage services. For example, storage engine 232 in an embodiment may comprise compute nodes 240a and 240b, and storage engine 231 may comprise compute nodes 240c, and 240d. In some embodiments, pairs of the compute nodes (e.g., 240a and 240b) are organized within a storage engine (e.g., 232), for purposes of facilitating failover between compute nodes (e.g., between 240a and 240b) within storage system 210. In some embodiments, the paired compute nodes (e.g., 240a and 240b) of each storage engine (e.g., 232) are directly interconnected by communication links (e.g., 233). As used herein, the term "storage engine" will refer to a storage engine, such as storage engines 232 and 231, which has a pair of (two independent) compute nodes (e.g., 240a and 240b, or 240c and 240d, respectively). A given storage engine (e.g., 232) is implemented using a single physical enclosure and provides a logical separation between itself and other storage engines (e.g., 231) of the storage system 210. A given storage system 210 may include one or more of such storage engines (e.g., 231 or 232).

Each compute node (e.g., 240a, 240b, 240c, or 240d), includes processors (e.g., 242a or 242b) and a local-to-node volatile memory (e.g., 243a, or 243b). The processors (e.g., 242a or 242b) may include a plurality of multi-core processors of one or more types, e.g., including multiple CPUs, GPUs, and combinations thereof. Each processor (e.g., 242a or 242b) of the data storage system/data center(s) 210 in an embodiment may be referred to herein as "local-to-data storage system," indicating location of that processor within the data storage system/data center(s) 210, or "local-to-node," indicating location of the processor within a computing node (e.g., 242a or 242b, respectively) of the data storage system/data center(s) 210. Processors (e.g., 242a, or 242b) referred to herein as "local-to-data storage system," or "local-to-node," in such a manner may also be considered as remote hardware processors from the perspective of the UEM platform 200, in that the hardware processors (e.g., 242a or 242b) located at the data storage system/data center(s) 210 in an embodiment may be located "remotely" from the UEM platform 200.

The local-to-node volatile memory (e.g., 243a, or 243b) may include, for example and without limitation, any type of RAM. Each compute node (e.g., 240a, or 240b) may also include one or more front end adapters (e.g., 241a, or 241b, respectively) for communicating with the host computer 270 and a load-balancing agent 216 of the data storage system/data center(s) 210. Each compute node (e.g., 240a, or 240b) may also include one or more back-end adapters (e.g., 245a, or 245b, respectively) for communicating with respective associated back-end drive arrays (e.g., 250a, or 250b), thereby enabling access to managed drives (e.g., 251, 252, 253, or 254). A given storage system 210 may include one back-end drive array (e.g., 250a) or multiple back-end drive arrays (e.g., 250a and 250b).

In some embodiments, managed drives (e.g., 251, 252, 253, or 254) are storage resources dedicated to providing data storage to storage system 210 or are shared between a set of storage systems (e.g., 210). Managed drives (e.g., 251, 252, 253, or 254) may be implemented using numerous types of memory technologies for example and without limitation any of the SSDs and HDDs mentioned above. In some embodiments the managed drives (e.g., 251, 252, 253, or 254) are implemented using NVM (Non-Volatile Memory) media technologies, such as NAND-based flash, or higher-performing SCM (Storage Class Memory) media technologies such as 3D XPoint and ReRAM (Resistive RAM). Managed drives (e.g., 251, 252, 253, or 254) may be directly connected to the compute nodes (e.g., 240a or 240b) using a PCIe (Peripheral Component Interconnect Express) bus or may be connected to the compute nodes (e.g., 240a or 240b) for example, by an IB (InfiniBand) bus or fabric.

In some embodiments, each compute node (e.g., 240a or 240b) also includes one or more channel adapters (e.g., 244a, or 244b, respectively) for communicating with other compute nodes directly or via an interconnecting fabric 212. An example interconnecting fabric 212 may be implemented using InfiniBand. Each compute node (e.g., 240a or 240b) may allocate a portion or partition of its respective local-to-node volatile memory (e.g., 243a, or 243b, respectively) to a virtual shared "global" memory 211 that can be accessed by other compute nodes (e.g., 240a or 240b), e.g., via DMA (Direct Memory Access) or RDMA (Remote Direct Memory Access). Shared global memory 211 will also be referred to herein as the cache of the storage system 210.

As described herein, the data storage system/data center(s) 210 maintains data for the host applications 274 running on one or more enterprise host computers (e.g., 270). Logical storage devices are created and presented to the host application 274 for storage of the host application 274 data. The host memory 272 is a single data storage device having a set of contiguous fixed-size LBAs (Logical Block Addresses) on which data used by the host application 274 resides and can be stored. However, the data used by the host application 274 and the storage resources available for use by the host application 274 may actually be maintained by the compute nodes (e.g., 240a, 240b, 240c, or 240d) at non-contiguous addresses (tracks) on various different managed drives (e.g., 251, 252, 253, or 254), compute node memories (e.g., 243a or 243b), or the shared global memory 211 within data storage system/data center(s) 210.

In some embodiments, the data storage system/data center(s) 210 maintains metadata that indicates, among various things, mappings between the memory 272 of the host computer 270 and the locations of extents of host application data in the managed drives (e.g., 251, 252, 253, or 254), compute node memories (e.g., 243a or 243b), or the shared global memory 211. In response to an IO (Input/Output command) generated at the host application 274 in an embodiment, the operating system (OS) 273 may determine whether the command can be serviced by accessing the host memory 272. If that is not possible, then the OS 273 prompts the IO manager 275 to transmit the IO command to one of the compute nodes (e.g., 240a, 240b, 240c, or 240d) to be serviced by the data storage system/data center(s) 210.

There may be multiple paths between the host computer 270 and the storage system 210, e.g., one path per front end adapter (e.g., 245a or 245b). The paths may be selected based on a wide variety of techniques and algorithms including, performance, load balancing, and CO2 minimization techniques. In the case where IO manager 275 generates a read command, the storage system 210 uses metadata to locate the commanded data, e.g., in the managed drives (e.g., 251, 252, 253, or 254), compute node memories (e.g., 243*a* or 243*b*), or the shared global memory 211. If the commanded data is not in the virtual shared global memory 211, then the data in an embodiment may be temporarily copied into the virtual shared global memory 211 from the managed drives (e.g., 251, 252, 253, or 254), or compute node memories (e.g., 243*a* or 243*b*) and sent to the host application 274 by the front-end adapter (e.g., 245*a* or 245*b*) of one of the compute nodes (e.g., 240*a* or 24*b*, respectively). In the case where the IO manager 275 generates a write command, in some embodiments the storage system 210 in an embodiment may copy a block being written into the virtual shared global memory 211 and create new metadata that maps the address of the data on the virtual shared global memory 211 to a location to which the block is written on the managed drives (e.g., 251, 252, 253, or 254). The virtual shared global memory 211 in an embodiment may enable the block written on the managed drives (e.g., 251, 252, 253, or 254) to be reachable via all of the compute nodes (e.g., 240*a*, 240*b*, 240*c*, or 240*d*) and paths, although the storage system 210 can be configured to limit use of certain paths to certain compute nodes.

The data storage system/data center(s) 210 in an embodiment may further comprise a display 213 for display of a graphical user interface 215, as described in greater detail below with respect to FIGS. 3A and 3B, as well as an operating system 214. The load-balancing agent 216 in an embodiment may operate to gather operational telemetry describing operational functionality of the various components of the data storage system/data center(s) 210, including the storage engine(s) 241 and 232, compute nodes 240*a*, 240*b*, 240*c*, and 240*d*, compute node processors 242*a* and 242*b*, compute node memories 243*a* and 243*b*, local-to-node volatile memories 244*a* and 244*b*, back-end adapters 245*a* or 245*b*, fabric 212, storage arrays 250*a* and 250*b*, shared global memory 211, and managed drives 251, 252, 253, and 254. The load-balancing agent 216 in an embodiment may be in communication with the various hardware components of the data storage system/data center(s) 210 (e.g., storage engines 231 or 232, computing nodes 240*a*, 240*b*, 240*c*, or 240*d*, compute node processors 242*a* or 242*b*, compute node memories 243*a* or 243*b*, compute node back-end adapters 245*a* or 245*b*, local-to-node volatile memories 244*a* or 244*b*, shared global memory 211, fabric 212, storage arrays 250*a* or 250*b*, and managed drives 251, 252, 243, or 254) and firmware for those components in an embodiment. For example, the load-balancing agent 216 may monitor power consumption by each of the various hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) in an embodiment. In another example embodiment, the load-balancing agent 216 may also access firmware for hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) to determine policies or settings for those components at the time of such power measurements. The load-balancing agent 216 may also receive workload redistribution instructions identifying a specific compression or decompression rate for read memory access functions, a specific compression or deduplication rate for write memory access functions, a specific encryption scheme for encryption tasks, or capping a number or frequency of executions of memory maintenance functions (e.g., snapshot tasks, backup tasks, encryption tasks, replication tasks) over a certain time period for execution at the data storage system/data center(s) 210 managed by an enterprise at one or more data centers.

More specifically, the load-balancing agent 216 in an embodiment may determine a total amount of power (e.g., in kWh) consumed during execution of various memory accessing functions within a given time window. The load-balancing agent 216 may monitor power consumed by each hardware component (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) used in execution of memory accessing functions such as reading from memory (e.g., 243*a*, 243*b*, 211, 250*a*, 250*b*, 251, 252, 253, or 254), writing to memory (e.g., 243*a*, 243*b*, 211, 250*a*, 250*b*, 251, 252, 253, or 254), or one of various tasks for maintenance of memory (e.g., 243*a*, 243*b*, 211, 250*a*, 250*b*, 251, 252, 253, or 254). In an embodiment, the load-balancing agent 216 may also monitor calls to various hardware processors (e.g., 242*a*, or 242*b*) of the computing nodes (e.g., 240*a*, or 240*b*, respectively) to determine, for the same time window, the percentage of all memory read functions that use a given compression or decompression rate (e.g., 128K, 64K, 8K), and a percentage of all memory write functions that use a given compression or deduplication rate (e.g., 129K, 16K, 8K). The load-balancing agent 216 in an embodiment may also monitor calls to the hardware processors (e.g., 242*a*, or 242*b*) to determine, for the same time window, the percentage of all memory maintenance functions to a specific memory maintenance task, such as a snapshot task, a backup task, a replication task, or an encryption task. In addition, the load-balancing agent 216 in an embodiment may monitor calls to the hardware processors (e.g., 242*a*, or 242*b*) to determine which encryption schemes are available for use in encryption tasks, and which schemes are used to execute the encryption tasks within the same time window.

The load-balancing agent 216 in an embodiment may also be capable of assessing and adjusting policies within firmware for one or more hardware components, upon managing user approval. For example, the load-balancing agent 216 may also direct one or more hardware processors (e.g., 242*a* or 242*b*) of the one or more compute nodes (e.g., 240*a* or 240*b*, respectively) to perform read or write memory accessing functions according to a specifically identified compression, decompression, or deduplication rate. As another example, the load-balancing agent 216 may direct the one or more hardware processors (e.g., 242*a* or 242*b*) of the one or more compute nodes (e.g., 240*a* or 240*b*, respectively) to cap the number or frequency of memory maintenance functions (e.g., snapshot tasks, backup tasks, replication tasks, encryption tasks) executed within an identified time window. As yet another example, the load-balancing agent 216 may direct the one or more hardware processors (e.g., 242*a* or 242*b*) of the one or more compute nodes (e.g., 240*a* or 240*b*, respectively) to execute encryption tasks according to a specifically identified encryption scheme.

The load-balancing module 216 may routinely collect information at preset intervals in any of several known and predetermined data interchange format such as JavaScript Object Notation (JSON), of Extensive Markup Language (XML). Specific examples described herein may use the JSON format for consistency and ease of explanation, but any other type of existing or later developed predetermined data interchange format agreed upon between data sinks and sources may be used in various embodiments.

The load-balancing module 216 of the data storage system/data center(s) 210 in an embodiment may transmit information recorded in such a way at any given time to the communication agent 281 of the predictive task adjusting and $CO_2$ minimizing system 280 executing at the Unified Endpoint Management (UEM) platform 200. The JSON events (e.g., operational telemetry measurements) transmitted from the load-balancing agent 216 to the UEM platform 200 may further include, for example, a user-specified CO2 load-balancing threshold value for one or more hardware components (e.g., 211, 212, 213, 214, 215, 216, 231, 232, 240a, 240b, 240c, 240d, 241a, 241b, 242a, 242b, 243a, 243b, 244a, 244b, 245a, 245b, 250a, 250b, 251, 252, 253, or 254) of the data storage system/data center(s) 210, or for the data storage system/data center(s) 210 (e.g., datacenter) as a whole. For example, the managing user in an embodiment may employ a graphical user interface (GUI) (e.g., 215) at a management terminal 217 accessible by a managing user for the data storage system/data center(s) 210 to specify, for example, that CO2 emitted due to operation of the data storage system/data center(s) 210 (e.g., datacenter) as a whole, or operation of one or more hardware components (e.g., 211, 212, 213, 214, 215, 216, 231, 232, 240a, 240b, 240c, 240d, 241a, 241b, 242a, 242b, 243a, 243b, 244a, 244b, 245a, 245b, 250a, 250b, 251, 252, 253, or 254) of the data storage system/data center(s) 210 should not exceed an average CO2 emissions value by more than a certain percentage (e.g., 10%, 20%, 200%) as set by statute, regulation, operational need, or enterprise goals to limit CO2 generation.

In an embodiment, the load-balancing agent 216 may also routinely receive reports or information describing the carbon footprint associated with power consumed by various hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) within the data storage system/data center(s) 210. The CO2 emissions identified within such received reports may also be included within the JSON events collected by the load-balancing module and transmitted to the predictive task adjusting and CO2 minimizing system 280 in an embodiment. Such information may be gathered routinely by the load-balancing agent 216 from the CO2 optimization engine 285 via the communication agent 281 of the UEM platform 200. For example, the CO2 optimization engine 285 in an embodiment may track or determine CO2 emissions for each kWh of power consumed by the various hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) of the data storage system/data center(s) 210 based on the geographic location of the power station supplying power to those information hardware components as well as the power generation methods used to generate such power at the power source.

As described herein, CO2 emitted by any given hardware component (e.g., 231, 232, 240a, 240b, 240c, 240d, 241a, 241b, 242a, 242b, 243a, 243b, 244a, 244b, 211, 212, 250a, 250b, 251, 252, 253 or 254) within the data storage system/data center(s) 210 may be dependent upon power consumed during operation of those components, timing of such operations within a 24 hour cycle, and geographic location of those components. For example, various hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) may cause the emission of CO2 by consuming power delivered by power sources that burn fossil fuels, or capture more environmentally friendly solar, wind, or water power. The type of power plant providing such power for consumption by the various hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) and consequently, the CO2 emitted during consumption of power may depend upon the geographic location at which such power is consumed and the time of day at which such power is consumed. The amount of CO2 emitted during production of each kilowatt-hour (kWh) of power may vary greatly dependent upon the time of day or whether the power station or power source, sometimes referred to herein merely as a power source, and including power stations, hydropower plant sources, wind power system sources, power generating stations of various types that supply such power to a data storage system/data center 210 is undergoing a spike in consumption. For example, in many locations, consumption of power provided by more environmentally friendly power sources (e.g., hydroelectric, wind, solar, etc.) may be prioritized. In such cases, when the power consumption for a source spikes and exceeds the power available from those environmentally friendly power sources, the source may make power generated through less environmentally friendly methods (e.g., burning of fossil fuels) available to address the surge in demand. Thus, during such peak consumption time windows, the overall carbon footprint for power consumed from that source may increase drastically.

The UEM platform 200 in an embodiment may gather operational telemetry, like that described directly above, routinely from a plurality of hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) within the data storage system/data center(s) 210 operating in different geographic areas and under different usage patterns. The UEM platform 200 in an embodiment may execute a predictive task adjusting and CO2 minimizing system 280 to predict when one or more portions of an enterprise data storage system/data center(s) 210 is likely to execute a workload of memory accessing functions that will cause CO2 emissions due to power consumption at or above a maximum CO2 threshold value specific to that portion (e.g., one or more hardware components) of the enterprise data storage system/data center(s) 210. Such a prediction may be made using a time series forecasting engine 286 modelling a relationship between changes in CO2 emissions values by virtue of power consumption and changes in data storage system/data center(s) 210 operational telemetry measurements gathered at the UEM platform 200 over a training period and over a plurality of monitoring periods following such a training period. Data storage system/data center(s) 210 operational telemetry measurements including power analytics for power consumption, geographic location, a workload of memory accessing functions, as well as determined CO2 emissions values particular to one or more portions of the data storage system/data center(s) 210 (e.g., computing nodes, storage arrays, storage engines, managed drives, or global memory) and for memory operations executed there may be gathered during routine monitoring periods at the UEM platform 200 executing the predictive task adjusting and CO2 minimizing system 280. Each of these portions (e.g., 231, 232, 240a, 240b, 240c, 240d, 241a, 241b, 242a, 242b, 243a, 243b, 244a, 244b, 211, 212, 250a, 250b, 251, 252, 253 or 254) of the data storage system/data center(s) 210 may be under management of or in communication with a load balancing agent 216, which may act as an interface between the data storage system/data center(s) 210 and the UEM platform 200.

The UEM platform 200 in an embodiment may operate as a cloud-based service in communication with the load balancing agent 216 via a network to identify information technology (IT) issues at a plurality of components within the data storage system/data center(s) 210 within say, a data center. The UEM platform 200 and load balancing agent 216 may also provide support for such issues, including automatically updating drivers or hardware components, as needed. In a specific embodiment of the present disclosure, the UEM platform 200 may gather operational telemetry measurements from various hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) of the data storage system/data center(s) 210 that describe operating environments for those hardware components (e.g., geographic location, power consumption analytics, or memory accessing function workload analytics) at one or more data centers.

A predictive task adjusting and CO2 minimizing system 280 in an embodiment may use a time series forecasting engine 286 that models a relationship between changes in CO2 emissions values and changes in various operational telemetry measurements, including workload characteristics for memory accessing functions such as memory reads, memory writes, or memory maintenance functions (e.g., snapshots, backups, encryptions, etc.). For example, client information handling system operational telemetry measurements such as geographic location, power analytics, and memory accessing function workload characteristics may be used to predict that one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) will execute a workload of memory accessing functions in a future time window that will cause power consumption and consequently CO2 emissions that exceed a user-specified CO2 load-balancing threshold value for the data storage system/data center(s) 210 or for one or more hardware components therewithin. The time series forecasting engine 286 may then predict one or more adjustments that may be made to this initially forecasted future memory accessing function workload to cause consequent CO2 emissions to remain below the user-specified CO2 load-balancing threshold value for the data storage system/data center(s) 210 or for one or more hardware components therewithin executing various memory functions. The UEM platform 200 may receive operational telemetry measurements upon which such predicted future workloads for memory functions and related CO2 emissions for those memory functions and power consumed to execute them may be determined from various hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) of the data storage system/data center(s) 210.

As described herein, the computing nodes (e.g., 240*a*, 240*b*, 240*c*, 240*d*) of the data storage system/data center(s) 210 in some embodiments may orchestrate execution of memory accessing functions at one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) of the data storage system/data center(s) 210. In such an embodiment, the managing user of the data storage system/data center(s) 210 may orchestrate such execution across a plurality of hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) such as within a node, array, storage drive, or entire data center, for example. For example, the managing user may provide user instructions for orchestrating such operation via a management terminal 217 for the data storage system/data center(s) 210, that may further comprise a display 213, an operating system (OS) 214, and GUI 215.

Each data center (e.g., 210) within a data storage system may include at least one of such management terminals 217 in an embodiment.

In an embodiment, the UEM platform 200 may gather operational telemetry from each of the hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254), and may be capable of classifying various incidents with such JSON events according to the computing node, array, storage drive, or data center within which each of the various hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) is operating.

These operational telemetries may first be gathered during a training period during which a time series forecasting engine 286 may be trained to model a relationship between changes in various operational telemetry measurements, including workload characteristics for memory accessing functions, and changes in a determined CO2 emissions value relative to power consumed for those memory accessing functions for the hardware component (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) for various time windows within a 24 hour period. The time series forecasting engine 286 in an embodiment may then be trained to predict a pattern of memory accessing function executions (e.g., frequency with which certain workloads or memory maintenance tasks are performed) as well as a pattern of CO2 emissions fluctuations (e.g., time periods within a 24 hour period when power consumption, and thus CO2 emissions are likely to peak or exceed a threshold value for the data storage system/data center(s) 210 or for one or more hardware components therewithin set by a user). In such a way, the time series forecasting engine 286 in an embodiment may be trained to predict when a combination of memory accessing function workload and high demand on power supplied by the local power source is likely to result in execution of a planned future workload causing CO2 emissions exceeding a user-specified CO2 load-balancing threshold value for a data storage system/data center (s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin.

For example, the time series forecasting engine 286 operating at the UEM 200 may use the operational telemetry measurements gathered from the load-balancing agent 216 during a training period in order to model a relationship between workload characteristics for memory accessing functions executed by various hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) of the data storage system/data center(s) 210 during a given time window, and the CO2 emissions values for those hardware components during the same time window. The time series forecasting engine 286 in an embodiment may employ any of several time series forecasting algorithms or models known in the art. For example, the time series forecasting engine 286 in an embodiment may comprise an autoregressive integrated moving average (AMIRA) time series forecasting model. As described herein, many existing systems use such time series forecasting engines (e.g., 286) to predict future workloads in order to optimize throughput or minimize latency of a plurality of data storage system/data center(s) hardware components within a node, array, storage drive, or data center. These existing systems use such a time series forecasting method to predict future workloads based on previously executed workloads that likely include at least some routinely executed tasks.

The time series forecasting engine 286 in an embodiment may combine this ability to predict future workloads with an ability to predict future $CO_2$ emitted during power consumption from a specific power plant or source providing power to the data storage system/data center(s) 210 based on previous $CO_2$ emitted per kWh of power consumed from the same specific power plant or source. Such a combination may provide a robust and combined prediction of the future workload anticipated for a future time window, as well as the $CO_2$ likely to be emitted during execution of that future workload based on predicted power consumption during that future window and predicted $CO_2$ per kWh of power consumed from a specific power source during that future time window.

Following training of the time series forecasting engine 286, the UEM platform 200 in an embodiment may receive monitoring period operational telemetry including updated information of the same type identified within the training period operational telemetry discussed above. For example, once the time series forecasting engine 286 in an embodiment is trained to predict $CO_2$ emissions values based on forecasted workloads in connections with power source used at various future time windows, the UEM platform 200 may enter a monitoring period in which it routinely receive monitoring period operational telemetries from each of the various hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) of the data storage system/data center(s) 210. Such operational telemetry may include a description of the load of memory accessing functions by type, and by memory maintenance function as executed at each of the various hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254), as well as a determined $CO_2$ emissions value for each of these memory accessing types and memory maintenance functions for power sourced to the data storage system/data center(s) 210, and a user-specified $CO_2$ load-balancing threshold value for a data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin.

The trained time series forecasting engine 286 of the predictive task adjusting and $CO_2$ minimizing system 280 may then use these monitoring period operational telemetries to predict that execution of a forecasted future load of memory accessing functions will cause a future $CO_2$ emissions value that exceeds the $CO_2$ load-balancing threshold value for a data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin. The time series forecasting engine 286 in an embodiment may identify future time windows in which the planned or expected routine execution of such memory accessing functions at one or more of the various hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) of the data storage system/data center(s) 210 will likely cause $CO_2$ emissions (e.g., from the local power source from which that hardware component will consume power to perform such an execution) that exceeds the user-specified $CO_2$ emissions value. This may occur, for example, if the forecasted workload for that time window increases markedly above an average workload, or if the workload for that time window is expected to occur during peak consumption hours for that power source or region, causing the power source to begin burning fossil fuels in order to address the surge in demand, in some embodiments.

As described herein, once a future time window is identified in which the planned or expected routine execution of memory accessing functions will likely cause $CO_2$ emissions exceeding the user-specified $CO_2$ emissions value in an embodiment, the time series forecasting engine 286 may be used to identify adjustments to the expected workload for that time window that may decrease the carbon footprint for execution of that workload. For example, the time series forecasting engine 286 may be used at the UEM platform 200 to forecast whether various adjustments to execution of memory access types and memory maintenance functions at a given hardware component (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) of the data storage system/data center(s) 210 during the upcoming time window may decrease the predicted $CO_2$ emissions value associated with that workload below the user-specified $CO_2$ load-balancing threshold value for the data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin.

The predictive task adjusting and $CO_2$ minimizing system 280 in an embodiment may test whether one or more memory maintenance functions or memory access types may be adjusted to decrease the resulting $CO_2$ emissions based on reduced operations and power consumed at the data storage system/data center(s) 210 below the user-specified $CO_2$ load-balancing threshold value for the data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin. More specifically, the predictive task adjusting and $CO_2$ minimizing system 280 may test whether adjusting the memory maintenance functions or memory access types predicted to cause the highest power consumption relative to other memory maintenance functions or memory access types within the predicted future workload may decrease predicted $CO_2$ emissions at the data storage system/data center(s) 210 below the user-specified $CO_2$ load-balancing threshold value for the data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin, as described in greater detail below with respect to FIG. 5. Potential adjustments to write memory access type and read memory access type may include, for example, decreasing the compression, decompression, or deduplication rates at the data storage system/data center(s) 210. In another example, potential adjustments to memory maintenance functions may include decreasing the frequency of encryption, snapshots, replication, and backups for memories at the data storage system/data center(s) 210.

The predictive task adjusting and $CO_2$ minimizing system 280 in an embodiment may use the time series forecasting engine 286 to perform such tests for adjustments to the predicted workload and consequent changes in $CO_2$ emissions predicted by prompting the time series forecasting engine 286 to predict an adjusted $CO_2$ emissions value based on adjusted forecasted future load of memory accessing functions across one or more hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) of the data storage system/data center(s) 210. For example, the predictive task adjusting and $CO_2$ minimizing system 280 in an embodiment may test whether decreasing the read memory compression rate from 128K to 64K may decrease the $CO_2$ emissions below the user-specified $CO_2$ load-balancing threshold value for the data storage system/data center(s) 210 or one or more hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) therewithin. In such an embodiment, the predictive task adjusting and $CO_2$ minimizing system 280 in such an example embodiment may prompt the time series forecasting engine 286 to predict the $CO_2$ likely to be emitted by such an adjusted predicted workload at the data storage system/data center(s) 210 (e.g., in which some or all 128K compression write functions are converted to 16K compression write functions).

In other example embodiments, the predictive task adjusting and $CO_2$ minimizing system 280 may prompt the time series forecasting engine 286 to predict the $CO_2$ likely to be emitted by a predicted workload adjusted by increasing the write compression rate (e.g., shifting from 64K to 128K compression rate) or by decreasing the number of write compression functions executed for at one or more rates. In still other example embodiments, the predictive task adjusting and $CO_2$ minimizing system 280 may prompt the time series forecasting engine 286 to predict the $CO_2$ likely to be emitted by a predicted workload at the data storage system/data center(s) 210 adjusted by decreasing the write deduplication rate or by decreasing the number of write deduplication functions executed. In yet further example embodiments, the predictive task adjusting and $CO_2$ minimizing system 280 may prompt the time series forecasting engine 286 to predict the $CO_2$ likely to be emitted by a predicted workload at the data storage system/data center(s) 210 adjusted by decreasing the frequency or number of memory maintenance functions executed, such as snapshot tasks, backup tasks, replication tasks, or encryption tasks. In still other example embodiments, the predictive task adjusting and $CO_2$ minimizing system 280 may prompt the time series forecasting engine 286 to predict the $CO_2$ likely to be emitted by a predicted workload at the data storage system/data center(s) 210 adjusted by changing the encryption scheme used while the encryption tasks are executed.

In an embodiment in which an adjusted future $CO_2$ emissions value predicted by the time series forecasting engine 286 based on the adjusted forecasted future load of memory accessing functions to be executed across a plurality of hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) at the data storage system/data center(s) 210 falls below the user-specified $CO_2$ load-balancing threshold value for the data storage system/data center(s) 210 or one or more hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) therewithin, the predictive task adjusting and $CO_2$ minimizing system 280 may transmit the predicted power consumption for the initial and adjusted forecasted future workloads of memory accessing functions to be executed across a plurality of hardware components (e.g., 231, 232, 240a, 240b, 240c, 240d, 241a, 241b, 242a,

242b, 243a, 243b, 244a, 244b, 211, 212, 250a, 250b, 251, 252, 253 or 254) at the data storage system/data center(s) 210, resulting $CO_2$ emissions, and recommended adjustments to the initial forecasted future load of memory accessing function to the load-balancing agent 216 orchestrating operation of the various hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) of the data storage system/data center(s) 210. Such information in an embodiment may comprise the initial predicted workload for a given time window predicted to cause $CO_2$ emissions to likely exceed the user-specified $CO_2$ load-balancing threshold value for the data storage system/data center(s) 210 or one or more hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) therewithin, as well as one or more adjusted predicted workloads for the same time window, tested as described above and below at FIG. 5 in greater detail. This information transmitted from the predictive task adjusting and $CO_2$ minimizing system 280 to the load-balancing agent 216 of the data storage system/data center(s) 210 may further include the forecasted $CO_2$ emissions resulting from the initially forecasted workload, each of the adjusted forecasted future workloads, and specific recommendations to adjust the initially forecasted future workload to decrease $CO_2$ emitted during the future time window below the user-specified $CO_2$ load-balancing threshold value for a data storage system/data center(s) 210 or one or more hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) therewithin.

A graphical user interface (GUI) 215 at the management terminal 217 of the data storage system/data center(s) 210 may receive the predicted power consumption for initial and adjusted forecasted future loads of memory accessing functions and resulting predicted $CO_2$ emissions from the predictive task adjusting and $CO_2$ minimizing 280 via the communication agent 281 and the load-balancing agent 216. In some embodiments, the GUI 215 may also receive one or more recommendations for adjusting the initial forecasted future load of memory accessing functions and a workload redistribution recommendation for various hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) of the data storage system/data center(s) 210

Figure 3A:
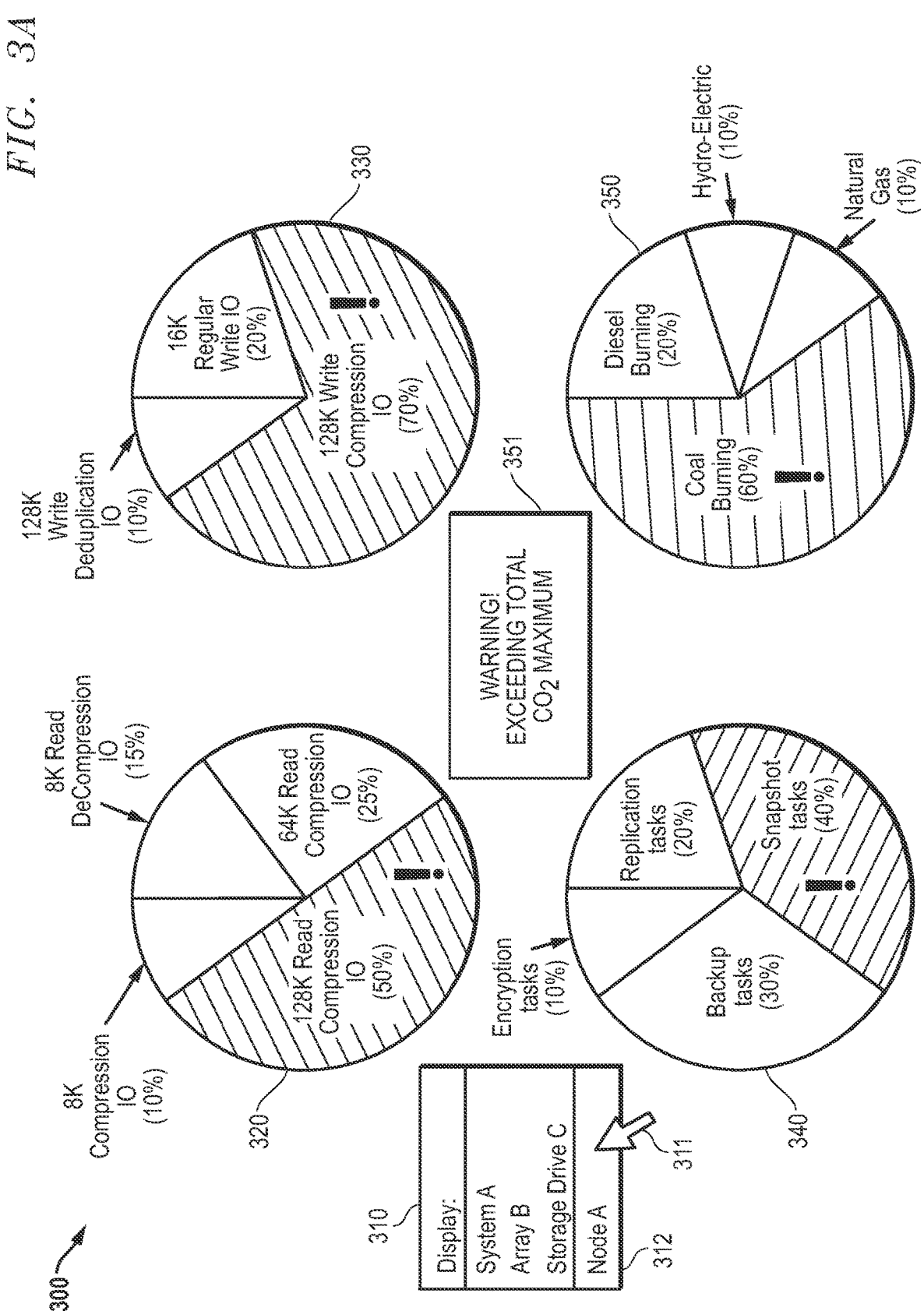
FIG. 3A is a graphical diagram illustrating a graphical user interface (GUI) of a data storage system with one or more data center(s) displaying forecasted future memory access function workloads according to an embodiment of the present disclosure.

The GUI 215 at the data storage system/data center(s) 210 in an embodiment may display, via the display 213 within the management terminal 217, a graphical or textual description of a memory access function workload predicted by the time series forecasting engine to cause $CO_2$ emissions exceeding a user-specified $CO_2$ load-balancing threshold value for the data storage system/data center(s) 210 or one or more hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) therewithin, as described in greater detail with respect to FIGS. 3A, and 6, below, for display to a manager/user of the data storage system/data center(s) 210. The GUI 215 in such an embodiment may further describe for the managing user, via the management terminal 217, the initially forecasted future load of memory accessing functions predicted to cause such $CO_2$ emissions by memory maintenance function or by memory access type, for example. This may provide the managing user with a visual depiction of the types of memory access functions predicted to cause $CO_2$ emissions to exceed the user-specified $CO_2$ load-balancing threshold value for the data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin, and to better understand how planned workloads affect carbon footprint across computing nodes, storage drives, arrays, or data centers.

In another example embodiment, as described in greater detail below with respect to FIGS. 3B, and 6, the GUI 215 may display for the managing user, via the management terminal 217, an adjusted forecasted future load of memory accessing functions predicted to cause a future $CO_2$ emissions value below the $CO_2$ load-balancing threshold value for the data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin for the same time window described directly above and in greater detail below with respect to FIG. 3A. For example, this information may display for the managing user, via the management terminal 217, adjusted forecasted future load of memory determined by the time series forecasting engine 286, as predicted based on adjustments to the initially forecasted future load of memory accessing functions initially predicted to cause $CO_2$ emissions exceeding the user-specified $CO_2$ load-balancing threshold value for the data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin. These adjustments may be displayed for the managing user, via the management terminal 217, along with a predicted effect of such an adjustment on the forecasted future load of memory accessing functions and upon the $CO_2$ emitted due to such an execution across a plurality of hardware components executed across a plurality of hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) at the data storage system/data center(s) 210. This may visually inform the managing user of the data storage system/data center(s) 210 upon which such an adjusted workload will be executed in the future that minor adjustments to memory accessing functions (e.g., read memory access, write memory access, or memory maintenance function) may be associated with significant reductions in $CO_2$ emissions during time windows in which the power source supplying power for execution of such costs relies on less environmentally-friendly methods for power generation (e.g., burning of fossil fuels).

The GUI 215 in an embodiment may also operate to receive a managing user selection to accept or reject a recommended adjustment. In an embodiment in which the GUI 215 has received a managing user instruction to accept one or more of the recommendations to adjust the initially forecasted future load of memory accessing functions suggested by the predictive task adjusting and $CO_2$ minimizing system 280, the load-balancing agent 216 at the data storage drive 210 may transmit a user instruction to accept the recommended adjustment to the UEM platform 200. The predictive task adjusting and $CO_2$ minimizing system 280 in such an embodiment may identify workload redistribution instructions for implementation of the adjustments to the initially forecasted future load of memory accessing functions selected for implementation by the user. More specifically, the predictive task adjusting and $CO_2$ minimizing system 280 may work in tandem with the load-balancing module 283 at the UEM platform 200 to identify workload redistribution instructions for adjusting the initially forecasted future load of memory accessing functions to be executed across a plurality of hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) at the data storage system/data center(s) 210, and initially forecasted by the time series forecasting engine 280 as likely to cause $CO_2$ emissions above the user-specified $CO_2$ load-balancing threshold value for the data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin. The workload redistribution instructions selected by the predictive task adjusting and $CO_2$ minimizing system 280, in tandem with the load-balancing module 283, in such an embodiment may correlate to the adjustments to the initially forecasted future load of memory accessing functions tested as described directly above and below with respect to FIG. 5, and predicted by the time series forecasting engine 286 to result in $CO_2$ emissions below the user-specified $CO_2$ load-balancing threshold value for the data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin.

The predictive task adjusting and $CO_2$ minimizing system 280 operating at the UEM platform 200 in an embodiment may then return the workload redistribution instruction to the load-balancing agent 216 for execution of the user-selected adjustments at one or more of the various hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) of the data storage system/data center(s) 210 during the upcoming time window.

The load-balancing module 216 for the data storage system/data center(s) 210 executing the workload redistribution instructions may operate in tandem with a local-to-data storage system processor (e.g., 242*a*, or 242*b* or compute node 240*a* or 240*b*, respectively) to execute the workload redistribution instruction. In some cases, this may occur across a plurality of compute nodes (e.g., 240*a*, 240*b*, 240*c*, or 240*d*). In such a way, the predictive task adjusting and $CO_2$ minimizing system, including the time series forecasting engine may preemptively recommend adjustments to workloads expected to cause high carbon footprints during future time windows in order to limit or avoid $CO_2$ emissions values forecasted to exceed a user-specified $CO_2$ load-balancing threshold value for a data storage system/data center(s) or one or more hardware components therewithin.

FIG. 3A is a graphical diagram illustrating a graphical user interface (GUI) of a data storage system/data center(s) displaying for the managing user, via the management terminal 217, forecasted future memory access function workloads predicted by a time series forecasting engine to cause carbon dioxide ($CO_2$) emissions exceeding a user-specified $CO_2$ load-balancing threshold value for a data storage system/data center(s) or one or more hardware components therewithin according to an embodiment of the present disclosure. The GUI at a management terminal of the data storage system/data center(s) in an embodiment may display for the managing user, via the management terminal, a graphical or textual description of a memory access function workload predicted by the time series forecasting engine to cause $CO_2$ emissions exceeding a user-specified $CO_2$ load-balancing threshold value for a data storage system/data center(s) or one or more hardware components therewithin. For example, as described in greater detail below with respect to FIG. 4, the time series forecasting engine in an embodiment may predict such an initially forecasted future load of memory accessing functions that may cause a future $CO_2$ emissions value that exceeds a user-specified $CO_2$ load-balancing threshold value for a data storage system/data center(s) or one or more hardware components therewithin.

An initial forecast GUI 300 may display the initially forecasted future load of memory accessing functions predicted to cause $CO_2$ emissions exceeding the $CO_2$ load-balancing threshold value for a data storage system/data center(s) or one or more hardware components therewithin. The managing user of the initial forecast GUI 300 in an embodiment may use the drop-down menu 310 to select a computing node, data storage system, array, storage drive, or data center for which the managing user may wish to view the forecasted workload during an upcoming time window. More specifically, the managing user may select via cursor 311 to view the upcoming initially forecasted future load of memory accessing functions for a computing "node A" (e.g., Compute Node 240a of FIG. 2, above) comprising one or more data storage system/data center(s) hardware components (e.g., 241a, 242a, 243a, 244a, 245a of FIG. 2, above). The initial forecast GUI 300 in such an example embodiment may indicate to the managing user via the warning dialogue box 351 that the predictive task adjusting and $CO_2$ minimizing system has predicted that the memory accessing workload for a future time window and the user-specified computing node, data storage system, array, storage drive, or data center will cause $CO_2$ emissions above a user-specified $CO_2$ load-balancing threshold value for a data storage system/data center(s) or one or more hardware components therewithin.

The initial forecast GUI 300 in such an embodiment may further describe the initially forecasted future load of memory accessing functions predicted to cause such $CO_2$ emissions by memory maintenance function or by memory access type, for example. This may provide the managing user with a visual depiction of the types of memory access functions predicted to cause $CO_2$ emissions to exceed the user-specified $CO_2$ load-balancing threshold value for a data storage system/data center(s) or one or more hardware components therewithin, and to better understand how planned workloads affect carbon footprint across computing nodes, storage engines, storage drives, data storage systems, arrays, or data centers. More specifically, the initial forecast GUI 300 may display for the managing user, via the management terminal, initially forecasted read access breakdown chart 320 that describes the percentage of read memory access types initially anticipated to occur using various compression rates or decompression rates. For example, the initially forecasted read access breakdown chart 320 in an embodiment may predict that 50% of the initially forecasted read memory accesses may use a 128K compression rate, 25% of the initially forecasted read memory accesses may use a 64K compression rate, 10% of the initially forecasted read memory accesses may use an 8K compression rate, and 15% of the initially forecasted read memory accesses may use an 8K decompression rate. Because the largest percentage (50%) of read memory accesses predicted to cause $CO_2$ emissions above the user-specified $CO_2$ load-balancing threshold value are expected to use the 128K compression rate, the initially forecasted read access breakdown chart 330 may also visually inform the managing user or manager of the data storage system/data center(s) upon which such a workload will be executed in the future that 128K compression read memory accesses may be associated with a higher anticipated $CO_2$ emissions value than other compression or decompression rate functions.

As another example, the initial forecast GUI 300 may display for the managing user, via the management terminal, initially forecasted write access breakdown chart 330 that describes the percentage of write memory access types initially anticipated to occur using various compression rates or deduplication rates. For example, the initially forecasted write access breakdown chart 330 in an embodiment may predict that 70% of the initially forecasted write memory accesses may use a 128K compression rate, 20% of the initially forecasted write memory accesses may use a 16K compression rate, and 10% of the initially forecasted write memory accesses may use a 128K deduplication rate. Because the largest percentage (70%) of write memory accesses predicted to cause $CO_2$ emissions above the user-specified $CO_2$ load-balancing threshold value are expected to use the 128K compression rate, the initially forecasted write memory access breakdown chart 330 may visually inform the managing user of the data storage system/data center(s) upon which such a workload will be executed in the future that 128K compression write memory accesses may be associated with a higher anticipated $CO_2$ emissions value than other compression or deduplication rate functions.

As yet another example, the initial forecast GUI 300 may display for the managing user, via the management terminal, initially forecasted memory maintenance function breakdown chart 340 that describes the percentage of memory maintenance functions initially anticipated to occur in the future time window. For example, the initially forecasted memory function breakdown chart 340 in an embodiment may predict that 40% of the initially forecasted memory maintenance functions may comprise snapshot tasks, 30% of the initially forecasted memory maintenance functions may comprise backup tasks, 20% of the initially forecasted memory maintenance functions may comprise replication tasks, and 10% of the initially forecasted memory maintenance functions may comprise encryption tasks. Because the largest percentage (40%) of memory maintenance functions predicted to cause $CO_2$ emissions above the user-specified $CO_2$ load-balancing threshold value comprise snapshot tasks, the initially forecasted memory maintenance function breakdown chart 340 may visually inform the user or manager of the data storage system/data center(s) upon which such a workload will be executed in the future that snapshot tasks may be associated with a higher anticipated $CO_2$ emissions value than other memory maintenance functions.

The initial forecast GUI 300 in an embodiment may also display for the managing user, via the management terminal, at a management terminal of a data storage system/data center(s) an initially forecasted $CO_2$ emissions source breakdown chart 350 that describes the percentage of each emissions source predicted to contribute to the future $CO_2$ emissions predicted to result from execution of the workload described at 320, 330, and 340 and indicated at 351 to exceed the user-specified $CO_2$ load-balancing threshold value. For example, the initially forecasted $CO_2$ emissions source breakdown chart 350 in an embodiment may predict that 60% of the $CO_2$ emissions predicted to result from execution of the initially forecasted future workload and to exceed the user-specified CO2 load-balancing threshold value may comprise CO2 emitted through the burning of coal. As another example, the initially forecasted CO2 emissions source breakdown chart 350 in an embodiment may predict that 20% of the predicted future CO2 emissions may comprise CO2 emitted through the burning of diesel, 10% of the predicted future CO2 emissions may comprise CO2 emitted through the burning of natural gas, and 10% of the predicted future CO2 emissions may comprise CO2 emitted through the generation of hydro-electric power. This may visually inform the managing user of the data storage system/data center(s) upon which such a workload will be executed in the future that any memory accessing function (e.g., read memory access, write memory access, or memory maintenance function) may be associated with higher CO2 emissions during time windows in which the power source supplying power for execution of such costs relies on less environmentally-friendly methods for power generation (e.g., burning of fossil fuels).

As described herein, the amount of CO2 emitted during production of each kilowatt-hour (kWh) of power may vary greatly dependent upon the time of day or whether the power source supplying such power is undergoing a spike in consumption. For example, in many locations, consumption of power provided by more environmentally friendly power sources (e.g., hydroelectric, wind, solar, etc.) may be prioritized. In such cases, when the power consumption for a source spikes and exceeds the power available from those environmentally friendly power sources, the source may make power generated through less environmentally friendly methods (e.g., burning of fossil fuels) available to address the surge in demand. Thus, during such peak consumption time windows, the overall carbon footprint for power consumed from that source may increase drastically. By displaying for the managing user, via the management terminal, the ways in which the carbon footprint of planned executions of memory accessing functions across a plurality of data storage system/data center(s) hardware components is impacted by these variations in fuel sources at certain time windows, as shown at 350 of the initial forecast GUI 300, the manager of such a data storage system/data center(s) may make more informed decisions about the timing of such memory accessing function executions.

Figure 3B:
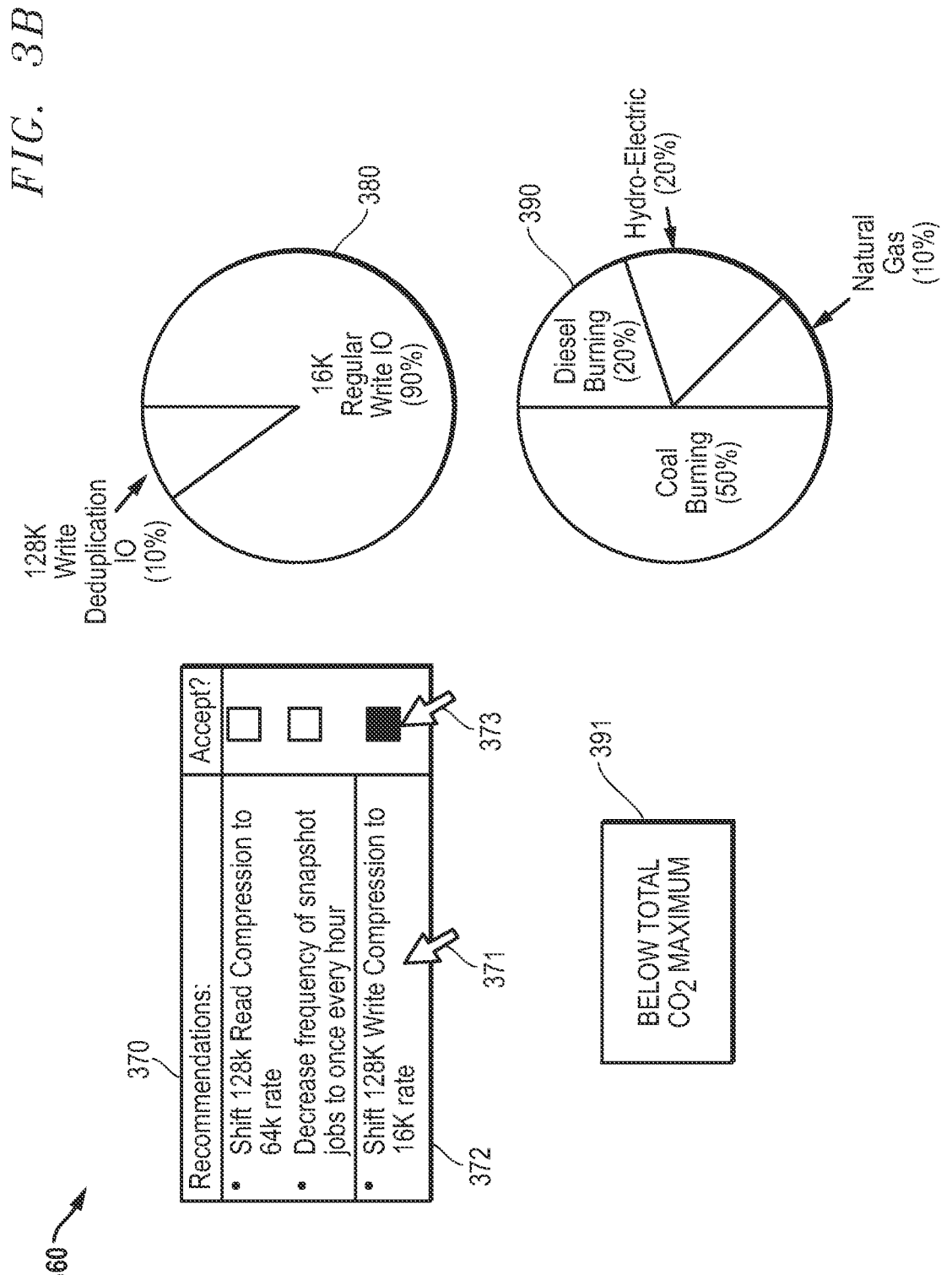
FIG. 3B is a graphical diagram illustrating a GUI of a data storage system with one or more data center(s) displaying recommendations for decreasing $CO_2$ emissions associated with forecasted future memory access functions according to an embodiment of the present disclosure.

FIG. 3B is a graphical diagram illustrating a graphical user interface (GUI) of a management terminal of a data storage system/data center(s) displaying for the managing user, via the management terminal, recommendations for adjusting future forecasted memory accessing function workloads to decrease CO2 emissions predicted by a time series forecasting engine below a user-specified CO2 load-balancing threshold value according to an embodiment of the present disclosure. In an embodiment, an adjusted forecast GUI 360 may display for the managing user, via the management terminal, an adjusted forecasted future load of memory accessing functions predicted to cause a future CO2 emissions value for a data storage system/data center(s) below the CO2 load-balancing threshold value for the same time window described above with respect to FIG. 3A. For example, the information described at FIG. 3B may display for the managing user, via the management terminal, adjusted forecasted future load of memory determined by the time series forecasting engine, as described in greater below with respect to FIG. 4. This adjusted forecasted future load in an example embodiment may be predicted based on adjustments to the initially forecasted future load of memory accessing functions initially predicted to cause CO2 emissions exceeding the user-specified CO2 load-balancing threshold value for the data storage system/data center(s) or one or more hardware components therewithin.

These adjustments may be displayed for the managing user, via the management terminal, within the adjusted forecast GUI 360 within the drop-down list 370. The managing user may select (e.g., via cursor 371) one or more recommended adjustments (e.g., shifting the 128K write memory access compression rate to 16K compression rate shown at 372) for the data storage system/data center(s). In other example embodiments, adjustments to other types of memory access functions or memory maintenance functions may be displayed for the managing user, via the management terminal. For example, as described in greater detail with respect to FIG. 5, below, the predictive task adjusting and CO2 minimizing system in an embodiment may suggest adjustments to memory maintenance functions or tasks, a read memory access type, or a write memory access type in order to decrease CO2 emissions below the user-specified CO2 load-balancing threshold value for the data storage system/data center(s) or one or more hardware components therewithin.

Upon a managing user selection of such a recommended adjustment (e.g., at 372), the adjusted forecast GUI 360 in an embodiment may display for the managing user, via the management terminal, the predicted effect of such an adjustment on the forecasted future load of memory accessing functions and upon the CO2 emitted due to such an execution across a plurality of hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) at the data storage system/data center(s) 210. For example, the adjusted forecast GUI 360 in an embodiment may display via dialogue box 391 that adjusting the future write memory access compression rate from 128K to 16K may result in CO2 emissions falling below the user-specified CO2 load-balancing threshold value for the data storage system/data center(s) or one or more hardware components therewithin. As another example, the adjusted forecast GUI 360 may display for the managing user, via the management terminal, adjusted forecasted write access breakdown chart 380 that describes the percentage of write memory access types adjusted to use compression rates or deduplication rates predicted to decrease the CO2 emissions below the user-specified CO2 load-balancing threshold value for the data storage system/data center(s) or one or more hardware components therewithin. More specifically, the adjusted forecasted write access breakdown chart 380 in an embodiment may predict that adjusting the initially forecasted future load of memory accessing functions such that 90% of the write memory accesses use a 16K compression rate, and 10% or write memory accesses use a 128K deduplication rate may decrease the CO2 emissions for the future workload below the user-specified CO2 load-balancing threshold value for the data storage system/data center(s) or one or more hardware components therewithin, as indicated at box 391.

The adjusted forecast GUI 360 in an embodiment may also display for the managing user, via the management terminal, an adjusted forecasted CO2 emissions source breakdown chart 390 that describes the percentage of each emissions source predicted to contribute to the future CO2 emissions predicted to result from execution of the workload described at 380 and indicated at 391 to fall below the user-specified CO2 load-balancing threshold value. More specifically, the adjusted forecasted CO2 emissions source breakdown chart 390 in an embodiment may predict that 50% of the CO2 emissions predicted to result from execution of the adjusted forecasted future workload and to fall below the user-specified CO2 load-balancing threshold value may comprise CO2 emitted through the burning of coal. For example, the adjusted forecasted CO2 emissions source breakdown chart 390 in an embodiment may predict that 20% of the predicted future CO2 emissions may comprise CO2 emitted through the burning of diesel, 10% of the predicted future CO2 emissions may comprise CO2 emitted through the burning of natural gas, and 20% of the predicted future CO2 emissions may comprise CO2 emitted through the generation of hydro-electric power.

In comparison with the initially forecasted CO2 emissions source breakdown chart (e.g., 350 or FIG. 3A), the adjusted forecasted CO2 emissions source breakdown chart 390 may indicate that shifting from a 128K write memory access compression rate to a 16K compression rate may result in 10% less consumption of power derived from the burning of fossil fuels and 10% more consumption of power derived from hydro-electric sources. This may occur, for example, when the recommended adjustment selected at 372 results in an overall decrease in power drawn from the power source that allows the power source to rely on more environmentally friendly power sources. In other words, if the recommended adjustment made by the predictive task adjusting and CO2 minimizing system decreases the power demand on the power source, the power source may not need to draw power from less environmentally friendly methods (e.g., burning of fossil fuels) to meet increased demand. This may visually inform the user or manager of the data storage system/data center(s) upon which such an adjusted workload will be executed in the future with some adjustments to memory accessing functions (e.g., read memory access, write memory access, or memory maintenance function) that may be associated with significant reductions in CO2 emissions during time windows in which the power source supplying power for execution of such costs relies on less environmentally-friendly methods for power generation (e.g., burning of fossil fuels).

The adjusted forecast GUI 360 in an embodiment may also receive a managing user selection from the data storage system/data center(s) to accept or reject a recommended adjustment. For example, the managing user may use a cursor 373 to select a check box beside one or more recommendations 370 made by the predictive task adjusting and CO2 minimizing system to reduce CO2 emissions during an upcoming time window. More specifically, the managing user may select at 373 to accept the recommendation by the predictive task adjusting and CO2 minimizing system to shift the write memory access functions from a 128K compression rate to a 16K compression rate during the upcoming time window in which the time series forecasting engine initially predicted CO2 emissions due to execution of such write memory access functions will exceed the user-specified CO2 load-balancing threshold value.

As described in greater detail herein, upon managing user selection of one or more such recommendations, the GUI at the data storage system/data center(s) in embodiments may transmit acceptance of specifically identified recommendations to the UEM platform, which may return a workload redistribution instruction for execution of the user-selected adjustments at the data storage system/data center(s) during the upcoming time window. In such a way, the predictive task adjusting and CO2 minimizing system, including the time series forecasting engine may preemptively recommend adjustments to workloads expected to cause high carbon footprints during future time windows in order to limit or avoid CO2 emissions values forecasted to exceed a user-specified CO2 load-balancing threshold value.

FIG. 4 is a flow diagram illustrating a method of training and using a time series forecasting engine of the predictive task adjusting and carbon dioxide (CO2) minimizing system for preemptively avoiding high CO2 emissions associated with execution of various memory accessing functions during periods of high power demand according to an embodiment of the present disclosure. As described herein, carbon footprint for a given workload across a plurality of data storage system/data center(s) hardware components (e.g., within a node, array, storage engine, storage drive, data storage system, or data center), the power consumption for the power source providing power to such systems may spike and exceeds the power available from more environmentally friendly power sources. In such a scenario, the power source may make power generated through less environmentally friendly methods (e.g., burning of fossil fuels) available to address the surge in demand. The predictive task adjusting and carbon dioxide (CO2) minimizing system in an embodiment may address this issue by determining an optimal distribution of memory accessing functions across a plurality of data storage system/data center(s) hardware components over time so as to minimize CO2 emissions for power used to conduct that workload.

The unified endpoint management (UEM) platform managing a plurality of such data storage system/data center(s) (or hardware components therein) may train a time series forecasting engine based on operational telemetry measurements gathered from each of the plurality of data storage system/data center(s) (or hardware components therein) to predict CO2 emissions resulting from power consumed during execution of various memory accessing functions across that plurality of data storage system/data center(s) (or hardware components therein). A CO2 optimization engine operating at the UEM platform may further identify a determined CO2 emissions value associated with these operational telemetry measurements, based on the carbon footprint associated with the power source supplying power, which itself may vary based on geographic location and type of power supplied at any given time (e.g., solar, wind, hydro-electric, fossil fuel burning, etc.).

The time series forecasting engine, once trained, may be used at the UEM platform to predict a future time window in which execution of a forecasted future load of memory accessing functions will cause future CO2 emissions that exceed a user-specified CO2 load-balancing threshold value. Once such a future time window is identified, the time series forecasting engine of the predictive task adjusting and CO2 minimizing system may identify one or more recommended adjustments to the expected workload for that time window that may decrease the predicted CO2 emissions value for the future time window below the user-specified CO2 load-balancing threshold value for the data storage system/data center(s) or one or more hardware components therewithin.

At block 402, the predictive task adjusting and CO2 minimizing system in an embodiment may receive training period operational telemetry (e.g., JSON incidents) including power consumption analytics, geographic location, user-specified CO2 load-balancing threshold value, load of memory accessing functions identified by memory maintenance function or memory access type, and determined CO2 emissions value for a plurality of hardware components of one or more data storage system/data center(s). For example, in an embodiment described with respect to FIG. 2, such operational telemetry in an embodiment may include measurements describing the load of memory accessing functions by type (e.g., read, write, compression rate, decompression rate, deduplication rate), and by memory maintenance function (e.g., encryption, snapshot, backup, replication) as executed at each of the data storage system/data center(s) hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) within a node, array, storage drive, storage engine, data storage system, or data center, for example. A CO2 optimization engine 285 operating at the UEM platform 200 may further identify a determined CO2 emissions value for each of these memory accessing types and memory maintenance functions, based on the carbon footprint associated with the power source supplying power consumed during such execution at a given data center (e.g., data storage system/data center(s) 210) at a given time. As described above, this carbon footprint may vary based on geographic location and type of power supplied at any given time (e.g., solar, wind, hydro-electric, fossil fuel burning, etc.). The determined CO2 emissions value associated with each recorded memory access type and memory maintenance function in embodiments may consequently also vary with the time of such execution.

The operational telemetry measurements received at block 402 by the UEM platform 200 may further include, for example, a user-specified CO2 load-balancing threshold value. For example, the managing user in an embodiment may employ a GUI (e.g., 215) at the data storage system/data center(s) 210. Such a managing user may specify, for example, that CO2 emissions values should not exceed an average CO2 emissions value by more than a certain percentage (e.g., 10%, 20%, 200%).

Such training period operational telemetry may be received periodically from a plurality of data storage system/data center(s) hardware components 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254 or a remote database of types of power sources used to generate power at various power sources within various geographic locations. For example, data storage system/data center(s) operational telemetry measurements including power analytics for power consumed by components, geographic location, workload characteristics of memory accessing functions, user-specified CO2 load-balancing threshold value, as well as determined CO2 emissions values particular to each data storage system/data center(s) hardware component and to their telemetric operations for executing various memory accessing functions may be gathered during routine monitoring periods from a plurality of data storage system/data center(s) hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) at the UEM platform 200 executing the predictive task adjusting and CO2 minimizing system 280.

The load-balancing agent 216 may routinely collect or record such operational telemetry measurements at preset intervals and transmit information received at any given time. The load-balancing agent 216 in an embodiment may also determine a percentage of power consumed due to workload of memory accessing functions that is attributable to each type of memory accessing task or each type of memory maintenance function for each of the hardware components involved in such execution at the data storage system/data center(s) 210. For example, the load-balancing agent 216 may identify all power consumed by each of the hardware components (e.g., 231, 232, 240*a*, 240*b*, 240*c*, 240*d*, 241*a*, 241*b*, 242*a*, 242*b*, 243*a*, 243*b*, 244*a*, 244*b*, 211,

212, 250*a*, 250*b*, 251, 252, 253 or 254) during execution of all memory accessing functions, and divide that total power consumption value by the percentage of all memory accessing functions that fell within each type or maintenance function, as determined by the load-balancing agent 216. More specifically, the load-balancing agent 216 may determine a percentage of all memory reads that were attributable to various compression rates (e.g., 128K, 64K, 8K) or decompression rates. As another example, the load-balancing agent 216 may determine a percentage of all memory writes that were attributable to various compression rates (e.g., 128K, 16K) or deduplication rates. As yet another example, the load-balancing agent 216 may determine a percentage of all memory accessing tasks that were attributable to various memory maintenance functions (e.g., encryptions, replications, backups, snapshots).

In some cases, the type of power production method used to generate power consumed at that geographic location at any given time of recordation may be drawn from a database recording such values for a plurality of geographic locations around the world. More specifically, such a database may identify, for any given time period, the percentage of kWh of power supplied to customers of a power source (e.g., including the plurality of data storage system/data center(s) hardware components 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254 for which operational telemetry measurements have been recorded) that are attributable to solar energy capture, wind energy capture, hydro-electric generation, or the burning of various fossil fuels (e.g., coal, gasoline, diesel, liquid natural gas (LNG), etc.). Each of these power generation sources may be associated with a different carbon footprint. For example, the burning of coal may cause much higher emissions of CO2 per kWh than the capture of energy through solar panels.

Such operational telemetry may further include a CO2 emissions value determined for the monitoring period in which each of these operational telemetry measurements were recorded within the operational telemetry. The load-balancing agent 216 in an embodiment may make such a determination based on power consumed during the monitoring period, length of the monitoring period, and pounds of CO2 emitted per kWh of power generated at the power plant providing power to the data storage system/data center(s) hardware component (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254). As described herein, CO2 emitted by any given data storage system/data center(s) hardware component (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) may be dependent upon power consumed during operation of the data storage system/data center(s) hardware component, geographic location (e.g., India) of the data storage system/data center(s) hardware component, and the type of power generation used (e.g., solar, hydro-electric, wind, burning of fossil fuels) at such a power source during any given time window. The amount of CO2 emitted during production of each kilowatt-hour (kWh) of power may vary greatly across different geographic regions and at differing time windows. For example, a power source may be more likely to supply power generated through the burning of fossil fuels during peak hours or power consumption in order to meet a surge in demand.

The CO2 optimization engine 285 in an embodiment may transmit location and time-specific CO2 emissions per kWh consumed for the geographic location of the data storage system/data center(s) 210 to the data storage system/data center(s) 210), based on the geographic location for the data storage system/data center(s) 210 and the time window during which power is consumed. The load-balancing agent 216 in an embodiment may multiply these received location-specific $CO_2$ emissions (e.g., $CO_2$ pounds per kWh) by the power consumed over a set period of time to determine a $CO_2$ emissions value for each data storage system/data center(s) hardware component (e.g., 231, 232, 240a, 240b, 240c, 240d, 241a, 241b, 242a, 242b, 243a, 243b, 244a, 244b, 211, 212, 250a, 250b, 251, 252, 253 or 254). The load-balancing agent 216 may further include such determined $CO_2$ emissions values as training input data, for example, within operational telemetry prior to transmission of the operational telemetry to the communication agent 281. The load-balancing agent 216 in an embodiment may then transmit the operational telemetry to the communication agent 281 of the predictive task adjusting and $CO_2$ minimizing system 280.

The time series forecasting engine of the predictive task adjusting and $CO_2$ minimizing system in an embodiment at block 404 may be trained to predict $CO_2$ emissions resulting from power consumed during execution of memory accessing functions across the plurality of data storage system/data center(s) hardware components. For example, the time series forecasting engine 286 operating at the UEM 200 may use the operational telemetry measurements gathered from the load-balancing agent 216 at block 402 during a training period in order to model a relationship between workload characteristics for memory accessing functions executed by a plurality of data storage system/data center(s) hardware components 231, 232, 240a, 240b, 240c, 240d, 241a, 241b, 242a, 242b, 243a, 243b, 244a, 244b, 211, 212, 250a, 250b, 251, 252, 253 or 254 during a given time window, and the $CO_2$ emissions values for that plurality of data storage system/data center(s) hardware components 231, 232, 240a, 240b, 240c, 240d, 241a, 241b, 242a, 242b, 243a, 243b, 244a, 244b, 211, 212, 250a, 250b, 251, 252, 253 or 254 during the same time window. The time series forecasting engine 286 in an embodiment may employ any of several time series forecasting algorithms or models known in the art. For example, the time series forecasting engine 286 in an embodiment may comprise an autoregressive integrated moving average (AMIRA) time series forecasting model. As described herein, many existing systems use such time series forecasting engines (e.g., 286) to predict future workloads in order to optimize throughput or minimize latency of a plurality of data storage system/data center(s) hardware components within a node, storage engine, data storage system, array, storage drive, or data center. These existing systems use such a time series forecasting method to predict future workloads based on previously executed workloads that likely include at least some routinely executed tasks.

The time series forecasting engine 286 in an embodiment may combine this ability to predict future workloads with an ability to predict future $CO_2$ emitted during power consumption from a specific power plant or source based on previous $CO_2$ emitted per kWh of power consumed from the same specific power plant or source. Such a combination may provide a robust and combined prediction of the future workload anticipated for a future time window, as well as the $CO_2$ likely to be emitted during execution of that future workload for particular memory accessing functions by telemetry of hardware power consumption based on predicted power consumption during that future window and predicted $CO_2$ per kWh of power consumed from a specific power source during that future time window. Thus, embodiments of the present disclosure, use such a time series forecasting engine 286 to predict and preemptively minimize $CO_2$ emissions during future time windows, as described in greater detail above and below with respect to the remainder of FIG. 4 and FIG. 5.

At block 406, the UEM platform in an embodiment following training of the time series forecasting engine may receive monitoring period operational telemetry including updated information of the same type identified within the training period operational telemetry received at block 402 and discussed above. For example, once the time series forecasting engine 286 in an embodiment is trained to predict $CO_2$ emissions values based on forecasted workloads at various future time windows, the UEM platform 200 may enter a monitoring period in which it routinely receive monitoring period operational telemetry from each of the data storage system/data center(s) hardware components (e.g., 231, 232, 240a, 240b, 240c, 240d, 241a, 241b, 242a, 242b, 243a, 243b, 244a, 244b, 211, 212, 250a, 250b, 251, 252, 253 or 254). Similarly to the training period operational telemetry described above with respect to block 402, the monitoring period operational telemetry gathered during this monitoring period may include operational telemetry measurements describing the load of memory accessing functions by type, and by memory maintenance function as executed at each of the data storage system/data center(s) hardware components (e.g., 231, 232, 240a, 240b, 240c, 240d, 241a, 241b, 242a, 242b, 243a, 243b, 244a, 244b, 211, 212, 250a, 250b, 251, 252, 253 or 254), as well as a determined $CO_2$ emissions value for each of these memory accessing types and memory maintenance functions, and a user-specified $CO_2$ load-balancing threshold value.

The trained time series forecasting engine of the predictive task adjusting and $CO_2$ minimizing system in an embodiment at block 408 may predict that execution of an initially forecasted future load of memory accessing functions will cause a future $CO_2$ emissions value that exceeds the $CO_2$ load-balancing threshold value. Following the training period, the time series forecasting engine trained during that period may then operate to predict future $CO_2$ emissions values based on expected future workload characteristics for the data storage system/data center(s) hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) during a future time window, and on expected $CO_2$ emitted per kWh consumed from the local power source during that time window. The time series forecasting engine may identify future time windows in which the planned or expected routine execution of such memory accessing functions will likely cause a carbon footprint exceeding the user-specified $CO_2$ emissions value, for example, if the forecasted workload of various memory accessing functions for that time window increases markedly above an average workload, or if the workload for that time window is expected to occur during peak consumption hours for that power source or region, causing the power source to begin burning fossil fuels in order to address the surge in demand.

For example, in an embodiment described with respect to FIG. 3A above, the time series forecasting engine of the predictive task adjusting and $CO_2$ minimizing system may identify a future time window in which the memory accessing function workload for a plurality of data storage system/data center(s) hardware components within node D (e.g., as selected for viewing by the managing user at 311 and 312) may cause $CO_2$ emissions exceeding a user-specified $CO_2$ load-balancing threshold value (e.g., as indicated at 351). In such an embodiment, as shown in FIG. 3A, the memory accessing workload expected to cause $CO_2$ emissions to exceed the user-specified $CO_2$ load-balancing threshold value may include 50% of memory reads at a 128K compression rate, 25% of memory reads at a 64K compression rate, 10% of memory reads at an 8K compression rate, and 15% of memory reads at an 8K decompression rate. In another example, the memory accessing workload expected to cause $CO_2$ emissions to exceed the user-specified $CO_2$ load-balancing threshold value may include 70% of memory writes at a 128K compression rate, 20% of memory writes at a 16K compression rate, and 10% of memory writes at a 128K deduplication rate. In yet another example, the memory accessing workload expected to cause $CO_2$ emissions to exceed the user-specified $CO_2$ load-balancing threshold value may include memory maintenance functions comprising 40% snapshot tasks, 30% backup tasks, 20% replication tasks, and 10% encryption tasks. The number of each of these memory maintenance functions or tasks may increase for any given time window based on the frequency with which the managing user has instructed the data storage system/data center(s) to orchestrate execution of these tasks across the plurality of data storage system/data center(s) hardware components in an embodiment.

As described herein, the time series forecasting engine of the predictive task adjusting and $CO_2$ minimizing system in an embodiment may provide a robust and combined prediction of the future workload anticipated for a future time window, as well as the $CO_2$ likely to be emitted during execution of that future workload, based on predicted power consumption during that future window and predicted $CO_2$ per kWh of power consumed from a specific power source during that future time window. For example, the time series forecasting engine in an embodiment may predict via a GUI at a management terminal of a data storage system/data center(s), as shown in FIG. 3A, that during the upcoming time window in which the workload described directly above is predicted to occur, 60% of the total power consumed by the plurality of data storage system/data center(s) hardware components executing this predicted workload may be generated through the burning of coal. The time series forecasting engine in such an embodiment that 20% of the power consumed may be generated through burning of diesel fuel, 10% through hydro-electric power generation, and 10% through burning of LNG. In such a way, the time series forecasting engine may predict and inform the manager of the plurality of data storage system/data center(s) hardware components about future expected workloads and the impact of those workloads on carbon footprints caused by power consumption.

At block 410, the time series forecasting engine may determine an adjusted forecasted future load of memory accessing functions predicted to cause a future $CO_2$ emissions value below the $CO_2$ load-balancing threshold value. As described herein, the trained time series forecasting engine may also predict one or more adjustments to the expected future workload during the time window described above at block 408 that may decrease the predicted carbon footprint resulting from execution of such an adjusted workload below a threshold value (e.g., a user-specified $CO_2$ load-balancing threshold value), as described in greater detail below with respect to FIG. 5. For example, in an embodiment described with respect to FIG. 2, the time series forecasting engine 286 may forecast whether decreasing the compression, decompression, or deduplication rates for expected read or writes to memories 246, 273, or 277 of the data storage system/data center(s) hardware components 231, 232, 240a, 240b, 240c, 240d, 241a, 241b, 242a, 242b, 243a, 243b, 244a, 244b, 211, 212, 250a, 250b, 251, 252, 253 or 254 during the upcoming time window may decrease the associated carbon footprint below the user-specified $CO_2$ load-balancing threshold value. In another example, the time series forecasting engine may forecast whether decreasing the frequency of certain memory maintenance functions such as encryption, snapshots, replication, and backups for memories 246, 273, or 277 of the data storage system/data center(s) hardware components 231, 232, 240a, 240b, 240c, 240d, 241a, 241b, 242a, 242b, 243a, 243b, 244a, 244b, 211, 212, 250a, 250b, 251, 252, 253 or 254 during the upcoming time window may decrease the associated carbon footprint below the user-specified $CO_2$ load-balancing threshold value.

The predictive task adjusting and $CO_2$ minimizing system in an embodiment at block 412 may transmit the predicted power consumption for the initial and adjusted forecasted future workloads of memory accessing functions, resulting $CO_2$ emissions, and recommended adjustments to the initial forecasted future load of memory accessing function to the plurality of data storage system/data center(s) hardware components. For example, the predictive task adjusting and $CO_2$ minimizing system in an embodiment may transmit such information to each of the plurality of data storage system/data center(s) hardware components 231, 232, 240a, 240b, 240c, 240d, 241a, 241b, 242a, 242b, 243a, 243b, 244a, 244b, 211, 212, 250a, 250b, 251, 252, 253 or 254. Such information in an embodiment may comprise the initial predicted workload for a given time window determined at block 408 to likely exceed the user-specified $CO_2$ load-balancing threshold value, as well as one or more adjusted predicted workloads for the same time window determined at block 410. As described in greater detail below with respect to FIG. 5, the adjusted predicted workload(s) may be predicted based upon one or more recommended adjustments to the initially predicted workload forecasted at block 408. The information transmitted at block 412 to the data storage system/data center(s) 210 in an embodiment may further include the forecasted $CO_2$ emissions resulting from the initially forecasted workload (block 408) and each of the adjusted forecasted future workloads (block 410 and FIG. 5), and specific recommendations to adjust the initially forecasted future workload (block 408) to decrease $CO_2$ emitted during the future time window below the user-specified $CO_2$ load-balancing threshold value.

At block 414 in an embodiment, the predictive task adjusting and $CO_2$ minimizing system may receive managing user acceptance or denial of recommended adjustments to the initially predicted future workload determined at block 408. As described in greater detail below with respect to FIG. 6, and above with respect to FIGS. 3A and 3B, a load-balancing agent (e.g., 216) may work in tandem with a GUI 215 at a data storage system/data center(s) (e.g., 210) to display the information transmitted at block 412 above and prompt the managing user to accept or decline the recommended adjustments to the initially predicted future workload. As described directly above, these recommendations may include adjusting the future workload initially forecasted at block 408 to decrease $CO_2$ emitted during the future time window below the user-specified $CO_2$ load-balancing threshold value. If the predictive task adjusting and $CO_2$ minimizing system has received indication that the managing user has accepted one or more recommended adjustments to the predicted workload, the method may proceed to block 416 for transmission of code instructions to implement the accepted adjustments. If the predictive task adjusting and CO2 minimizing system has received indication that the managing user has rejected all recommended adjustments to the predicted workload, this may indicate that the managing user has prioritized efficiency or speed of execution for the predicted workload over minimization of carbon footprint, and the method may end.

In an embodiment in which the managing user has accepted one or more recommended adjustments to the predicted workload identified at block 408, the predictive task adjusting and CO2 minimizing system at block 416 may transmit workload redistribution instructions to the data storage system/data center(s) 210 for deployment at the load-balancing agent 216. For example, as described below with respect to FIG. 5, upon determination of one or more adjustments to the future workload predicted above at block 408 to cause CO2 emissions exceeding the user-specified CO2 load-balancing threshold value, the predictive task adjusting and CO2 minimizing system may identify a workload redistribution instructions associated with the recommended adjustments to the future execution of memory maintenance functions.

As another example, as described with reference to FIG. 2 above, the predictive task adjusting and CO2 minimizing system 280 operating at the UEM 200 may transmit workload redistribution instructions to the data storage system/data center(s) 210. Such instructions may be received and implemented at the load-balancing agent 216 of the data storage system/data center(s) 210. Such instructions may limit the frequency, number, or type of memory accessing functions executed by each of the data storage system/data center(s) hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) to keep the CO2 emitted due to power consumed during execution of these functions below the user-specified CO2 load-balancing threshold value. In such a way, the predictive task adjusting and CO2 minimizing system may preemptively avoid high CO2 emissions associated with execution of various memory accessing functions during periods of high power demand. The method for training and using a time series forecasting engine of the predictive task adjusting and CO2 minimizing system may then end.

Figure 5:
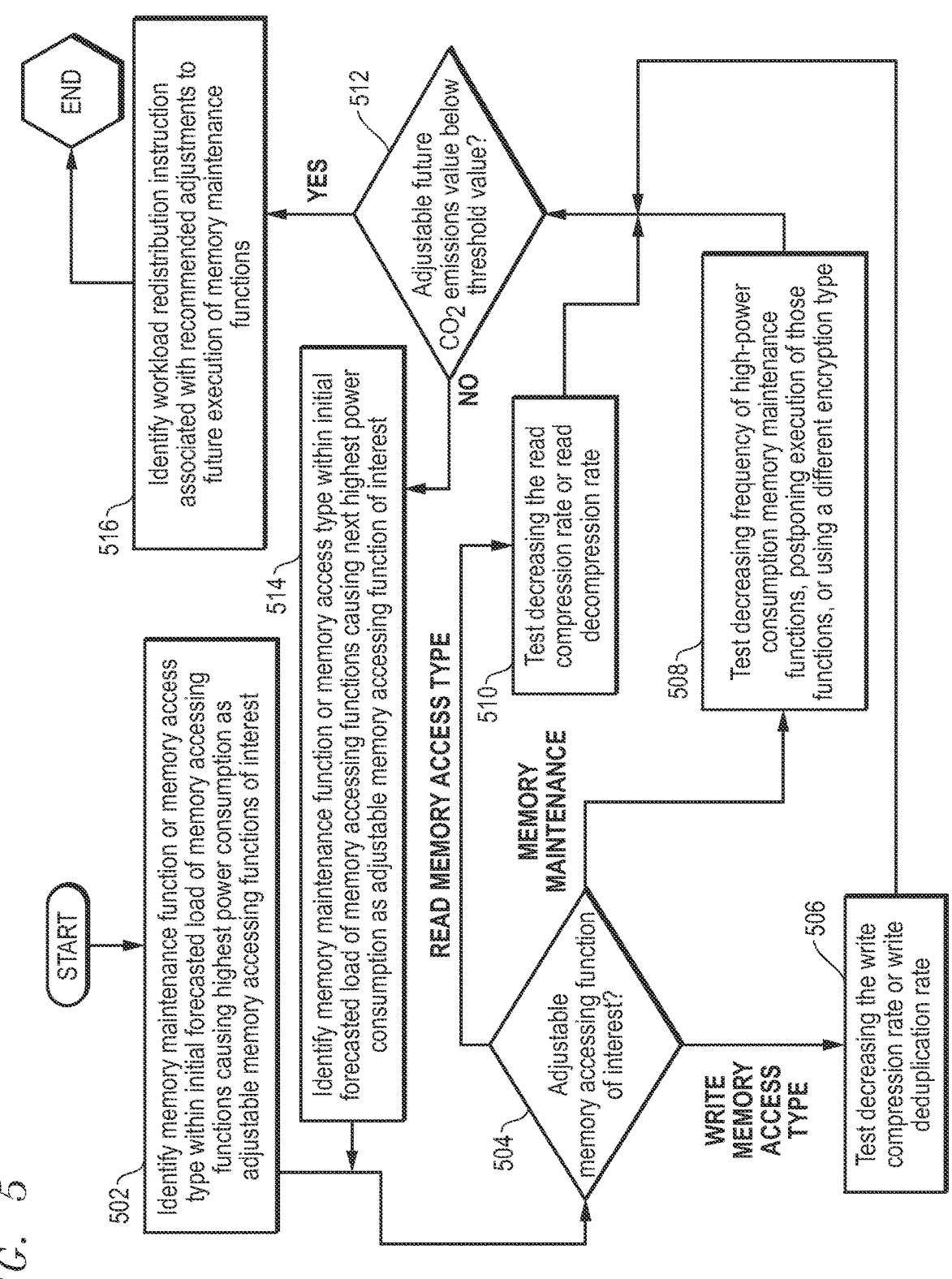
FIG. 5 is a flow diagram illustrating a method of predicting an adjustment to a future workload that will decrease $CO_2$ emissions below a user-specified threshold value according to an embodiment of the present disclosure.

FIG. 5 is a flow diagram illustrating a method of using a time series forecasting engine to predict an adjustment to a predicted future workload that decreases predicted carbon dioxide (CO2) emissions below a user-specified CO2 load-balancing threshold value according to an embodiment of the present disclosure. Once a future time window is identified in which a predicted future execution of memory accessing functions will likely cause a carbon footprint exceeding the user-specified CO2 emissions value, as described in greater detail with respect to FIG. 4 at block 408, for example, the time series forecasting engine may be used to identify adjustments to the expected workload for that time window that may decrease the carbon footprint for execution of that workload. For example, the time series forecasting engine may be used at the UEM platform to forecast whether various adjustments to memory access types and memory maintenance functions during the upcoming time window may decrease the predicted CO2 emissions value associated with that workload below the user-specified CO2 load-balancing threshold value. In order to perform this task, the predictive task adjusting and carbon dioxide (CO2) minimizing system in an embodiment may use the time series forecasting engine to test whether various adjustments for memory accessing functions at various hardware components of the data storage system/data center(s) expected to cause the highest power consumption may effectively decrease the expected CO2 emissions below the user-specified CO2 load-balancing threshold value.

At block 502, the predictive task adjusting and CO2 minimizing system in an embodiment may identify a first memory maintenance function or memory access type that may be adjusted to test whether such an adjustment may decrease the resulting CO2 emissions below the user-specified CO2 load-balancing threshold value. More specifically, the predictive task adjusting and CO2 minimizing system in an embodiment may select a first memory maintenance function or memory access type within the memory access function workload predicted above at block 408 of FIG. 4 to likely cause CO2 emissions above the user-specified CO2 load-balancing threshold value for potential adjustment. In an example embodiment described with respect to FIG. 2, the predictive task adjusting and CO2 minimizing system 280 may select such a first memory maintenance function or memory access type by identifying the memory maintenance function or memory access type within the predicted future workload (e.g., as predicted at block 408 of FIG. 4) that is predicted to cause the highest power consumption by one or more data storage system/data center(s) hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) relative to other memory maintenance functions or memory access types. For example, the predictive task adjusting and CO2 minimizing system 280 may select the memory access type 128K read compression as a first adjustable memory accessing function of interest at block 502 in an embodiment in which the 128K read compression is predicted to consume more power than the other predicted memory access types including 8K read compression, 8K read decompression, and 64K read compression.

The predictive task adjusting and CO2 minimizing system in an embodiment at block 504 may determine whether the adjustable memory accessing function of interest is a memory maintenance function, a read memory access type, or a write memory access type in order to later identify one or more potential adjustments that could be made to the adjustable memory access function of interest as executed across a plurality of data storage system/data center(s) hardware components. More specifically, potential adjustments to write memory access type and read memory access type may include, for example, decreasing the compression, decompression, or deduplication rates. In another example, potential adjustments to memory maintenance functions may include decreasing the frequency of encryption, snapshots, replication, and backups for memories. If the adjustable memory access function of interest is a write memory access type, the method may proceed to block 506 for using the time series forecasting engine 286 to test whether adjusting compression or deduplication rates for the adjustable memory access function of interest is predicted to decrease resulting CO2 emissions below the user-specified CO2 load-balancing threshold value. If the adjustable memory access function of interest is a read memory access type, the method may proceed to block 510 for using the time series forecasting engine 286 to test whether adjusting compression or decompression rates for the adjustable memory access function of interest is predicted to decrease resulting CO2 emissions below the user-specified CO2 load-balancing threshold value. If the adjustable memory access function of interest is a memory maintenance function, the method may proceed to block 508 for using the time series forecasting engine 286 to test whether adjusting frequency or timing of execution of the adjustable memory access function of interest or adjusting the encryption scheme employed is predicted to decrease resulting $CO_2$ emissions below the user-specified $CO_2$ load-balancing threshold value for the data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin.

At block 506, in an embodiment in which the adjustable memory access function of interest is a write memory access type, the predictive task adjusting and $CO_2$ minimizing system may use the time series forecasting engine to test whether adjusting compression or deduplication rates for the adjustable memory access function of interest is predicted to decrease resulting $CO_2$ emissions below the user-specified $CO_2$ load-balancing threshold value. For example, the predictive task adjusting and $CO_2$ minimizing system 280 in an embodiment in which the adjustable memory accessing function of interest is a 128K compression rate write function may adjust the predicted workload (e.g., as predicted at block 408 of FIG. 4) to shift some or all of the anticipated upcoming 128K compression rate write functions to the 16K write function. The predictive task adjusting and $CO_2$ minimizing system 280 in such an example embodiment may prompt the time series forecasting engine 286 to predict the $CO_2$ likely to be emitted by such an adjusted predicted workload (e.g., in which some or all 128K compression write functions are converted to 16K compression write functions) to be executed across a plurality of hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) at the data storage system/data center(s) 210.

In other example embodiments, the predictive task adjusting and $CO_2$ minimizing system 280 may prompt the time series forecasting engine 286 to predict the $CO_2$ likely to be emitted by a predicted workload adjusted by increasing the write compression rate (e.g., shifting from 64K to 128K compression rate) or by decreasing the number of write compression functions executed for at one or more rates. In still other example embodiments, in which the adjustable memory accessing function of interest is a write deduplication rate, the predictive task adjusting and $CO_2$ minimizing system 280 may prompt the time series forecasting engine 286 to predict the $CO_2$ likely to be emitted by a predicted workload adjusted by decreasing the write deduplication rate or by decreasing the number of write deduplication functions executed. The method may then proceed to block 512 to determine whether the $CO_2$ likely to be emitted by such an adjusted predicted workload, as predicted by the time series forecasting engine 286 falls below the user-specified $CO_2$ load-balancing threshold value for the data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin.

In an embodiment in which the adjustable memory access function of interest is a memory maintenance function, the predictive task adjusting and $CO_2$ minimizing system at block 508 may use the time series forecasting engine to test whether adjusting frequency or timing of execution of the adjustable memory access function of interest or adjusting the encryption scheme employed is predicted to decrease resulting $CO_2$ emissions below the user-specified $CO_2$ load-balancing threshold value. For example, the predictive task adjusting and $CO_2$ minimizing system 280 in an embodiment in which the adjustable memory accessing function of interest is a snapshot task may adjust the predicted workload (e.g., as predicted at block 408 of FIG. 4) to the total number or frequency of the anticipated upcoming snapshot tasks executed during the time window identified at block 408 of FIG. 4. The predictive task adjusting and $CO_2$ minimizing system 280 in such an example embodiment may prompt the time series forecasting engine 286 to predict the $CO_2$ likely to be emitted by such an adjusted predicted workload (e.g., in which snapshot tasks are limited by number or frequency) to be executed across a plurality of hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) at the data storage system/data center(s) 210.

In other example embodiments, the predictive task adjusting and $CO_2$ minimizing system 280 may prompt the time series forecasting engine 286 to predict the $CO_2$ likely to be emitted by a predicted workload adjusted by decreasing the frequency or number of other memory maintenance functions executed, such as backup tasks, replication tasks, or encryption tasks. In still other example embodiments, in which the adjustable memory accessing function of interest includes encryption tasks, the predictive task adjusting and $CO_2$ minimizing system 280 may prompt the time series forecasting engine 286 to predict the $CO_2$ likely to be emitted by a predicted workload adjusted by changing the encryption scheme used while the encryption tasks are executed. The method may then proceed to block 512 to determine whether the $CO_2$ likely to be emitted by such an adjusted predicted workload, as predicted by the time series forecasting engine 286 falls below the user-specified $CO_2$ load-balancing threshold value for the data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin.

At block 510, in an embodiment in which the adjustable memory access function of interest is a read memory access type, the predictive task adjusting and $CO_2$ minimizing system may use the time series forecasting engine to test whether adjusting compression or deduplication rates for the adjustable memory access function of interest is predicted to decrease resulting $CO_2$ emissions below the user-specified $CO_2$ load-balancing threshold value. For example, the predictive task adjusting and $CO_2$ minimizing system 280 in an embodiment in which the adjustable memory accessing function of interest is a 128K compression rate read function may adjust the predicted workload (e.g., as predicted at block 408 of FIG. 4) to shift some or all of the anticipated upcoming 128K compression rate read functions to the 64K compression rate read function. The predictive task adjusting and $CO_2$ minimizing system 280 in such an example embodiment may prompt the time series forecasting engine 286 to predict the $CO_2$ likely to be emitted by such an adjusted predicted workload (e.g., in which some or all 128K compression read functions are converted to 64K compression rate read functions) to be executed across a plurality of hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) at the data storage system/data center(s) 210.

In other example embodiments, the predictive task adjusting and $CO_2$ minimizing system 280 may prompt the time series forecasting engine 286 to predict the $CO_2$ likely to be emitted by a predicted workload adjusted by increasing the read compression rate (e.g., shifting from 64K to 128K compression rate) or by decreasing the number of read compression functions executed for at one or more rates. In still other example embodiments, in which the adjustable memory accessing function of interest is a read decompression rate, the predictive task adjusting and $CO_2$ minimizing system 280 may prompt the time series forecasting engine 286 to predict the $CO_2$ likely to be emitted by a predicted workload adjusted by decreasing the read decompression rate or by decreasing the number of read decompression functions executed. The method may then proceed to block 512 to determine whether the $CO_2$ likely to be emitted by such an adjusted predicted workload, as predicted by the time series forecasting engine 286 falls below the user-specified $CO_2$ load-balancing threshold value for the data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin.

In an embodiment in which the time series forecasting engine has been used to predict the impact of adjustments to predicted workloads on predicted resulting $CO_2$ emissions (e.g., as described above with respect to blocks 506, 508, and 510), the predictive task adjusting and $CO_2$ minimizing system may determine whether the predicted $CO_2$ emissions resulting from such proposed adjustments falls below the user-specified $CO_2$ load-balancing threshold value based on selected assessment for the data storage system/data center(s) 210 or one or more hardware components therewithin. For example, the predictive task adjusting and $CO_2$ minimizing system 280 may determine whether the $CO_2$ emissions predicted by the time series forecasting engine 286 to occur during execution of an adjusted forecasted future load of memory accessing functions input by the predictive task adjusting and $CO_2$ minimizing system 280 (e.g., based on potential adjustments identified at blocks 506, 508, or 510) fall below the user-specified $CO_2$ load-balancing threshold value. More specifically, the adjusted forecasted future load of memory accessing functions in an example embodiment may include the initially forecasted future load of memory accessing functions identified at block 408 of FIG. 4 adjusted at block 506 to decrease the compression rate for write functions. In such an example embodiment, the predictive task adjusting and $CO_2$ minimizing system 280 may determine whether the $CO_2$ emissions predicted by the time series forecasting engine 286 to occur during execution of the adjusted forecasted future load of memory accessing functions adjusted by decreasing the compression rate for write functions falls below the user-specified $CO_2$ load-balancing threshold value for the data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin.

As another example, the adjusted forecasted future load of memory accessing functions in an example embodiment may include the initially forecasted future load of memory accessing functions identified at block 408 of FIG. 4 adjusted at block 508 to decrease the number or frequency of memory maintenance functions. In such an example embodiment, the predictive task adjusting and $CO_2$ minimizing system 280 may determine whether the $CO_2$ emissions predicted by the time series forecasting engine 286 to occur during execution of the adjusted forecasted future load of memory accessing functions adjusted by adjusting the number or frequency of execution of memory maintenance functions falls below the user-specified $CO_2$ load-balancing threshold value for the data storage system/data center(s)

210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin.

As yet another example, the adjusted forecasted future load of memory accessing functions in an example embodiment may include the initially forecasted future load of memory accessing functions identified at block 408 of FIG. 4 adjusted at block 510 to decrease the compression rate for read functions. In such an example embodiment, the predictive task adjusting and $CO_2$ minimizing system 280 may determine whether the $CO_2$ emissions predicted by the time series forecasting engine 286 to occur during execution of the adjusted forecasted future load of memory accessing functions adjusted by decreasing the compression rate for read functions falls below the user-specified $CO_2$ load-balancing threshold value for the data storage system/data center(s) 210 or one or more hardware components (e.g., 231, 232, 240*a*, 240*b*, 240*c*, 240*d*, 241*a*, 241*b*, 242*a*, 242*b*, 243*a*, 243*b*, 244*a*, 244*b*, 211, 212, 250*a*, 250*b*, 251, 252, 253 or 254) therewithin.

In some cases, the time series forecasting engine may identify a plurality of such adjustments that may be made in order to decrease the carbon footprint below the user-specified $CO_2$ load-balancing threshold value for the data storage system/data center(s) or one or more hardware components therewithin. For example, in some embodiments in which no adjustments to a single adjustable memory accessing function of interest result in a predicted $CO_2$ emission below the user-specified $CO_2$ load-balancing threshold value for the data storage system/data center(s) or one or more hardware components therewithin, the predictive task adjusting and $CO_2$ minimizing system may identify a plurality or combination of the previously tested adjustable memory accessing functions of interest as the next adjustable memory accessing function of interest. In that case, the predictive task adjusting and $CO_2$ minimizing system in such an embodiment may prompt the time series forecasting engine to test whether a combination of adjustments to the combination of adjustable memory accessing functions of interest results in an adjusted future $CO_2$ emissions value below the user-specified $CO_2$ load-balancing threshold value for the data storage system/data center(s) or one or more hardware components therewithin. If the time series forecasting engine predicts the adjusted forecasted future load of memory accessing functions will cause $CO_2$ emissions falling below the user-specified $CO_2$ load-balancing threshold value, the method may proceed to block 516 for identification of workload redistribution instructions for implementation of the adjustments to the initially forecasted future load of memory accessing functions determined at block 408 that will result in execution of the adjusted forecasted load rather than the initially forecasted future load of memory accessing functions. If the time series forecasting engine predicts the adjusted forecasted future load of memory accessing functions will cause $CO_2$ emissions matching or exceeding the user-specified $CO_2$ load-balancing threshold value, the method may proceed to block 514 for identification of the next adjustable memory accessing function of interest that may be adjusted to decrease $CO_2$ emissions below the user-specified $CO_2$ load-balancing threshold value.

At block 514, in an embodiment in which the adjusted future $CO_2$ emissions value exceeds the user-specified $CO_2$ load-balancing threshold value, the predictive task adjusting and $CO_2$ minimizing system may identify a next memory maintenance function or memory access type that may be adjusted to test whether such an adjustment may decrease the resulting $CO_2$ emissions below the user-specified $CO_2$ load-balancing threshold value for the data storage system/data center(s) or one or more hardware components therewithin. For example, the predictive task adjusting and $CO_2$ minimizing system 280 may select the memory access type 128K write compression as a first adjustable memory accessing function of interest in an embodiment in which the 128K write compression is predicted to consume more power than the other predicted memory access types including 128K write deduplication, and 16K writes. As yet another example, the predictive task adjusting and $CO_2$ minimizing system 280 may select the memory maintenance function snapshot tasks as a first adjustable memory accessing function of interest in an embodiment in which the snapshot tasks are predicted to consume more power than the other memory maintenance functions, including replication tasks, encryption tasks, and backup tasks.

In an embodiment in which the time series forecasting engine predicts the adjusted forecasted future load of memory accessing functions will cause $CO_2$ emissions falling below the user-specified $CO_2$ load-balancing threshold value, the predictive task adjusting and $CO_2$ minimizing system at block 516 may identify workload redistribution instructions for implementation of the adjustments to the initially forecasted future load of memory accessing functions to be executed across a plurality of hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) at the data storage system/data center(s) 210. More specifically, the predictive task adjusting and $CO_2$ minimizing system 280 may work in tandem with the load-balancing module 283 to identify workload redistribution instructions for adjusting the initially forecasted future load of memory accessing function determined at block 408. The workload redistribution instructions selected by the predictive task adjusting and $CO_2$ minimizing system 280 may work in tandem with the load-balancing module 283 in such an embodiment may correlate to the adjustments to the initially forecasted future load of memory accessing functions tested at block 506, 508, or 510 and predicted by the time series forecasting engine 286 to result in $CO_2$ emissions below the user-specified $CO_2$ load-balancing threshold value, as determined at block 512. As described in greater detail above with respect to block 416, these workload redistribution instructions may be transmitted to the load-balancing agent 216 of the data storage system/data center(s) 210 via the communication agent 281 for implementation at data storage system/data center(s) 210.

Such an implementation of the adjusted forecasted future load of memory accessing functions at these data storage system/data center(s) hardware components (e.g., 231, 232, 240a, 240b, 240c, 240d, 241a, 241b, 242a, 242b, 243a, 243b, 244a, 244b, 211, 212, 250a, 250b, 251, 252, 253 or 254), rather than execution of the initially forecasted future load of memory accessing functions predicted at block 408, by the time series forecasting engine 286 may occur without managing user intervention to preemptively avoid power consumption resulting in $CO_2$ emissions exceeding the user-specified $CO_2$ load-balancing threshold value for the data storage system/data center(s) 210 or one or more hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) therewithin in some embodiments. In such a way, the predictive task adjusting and $CO_2$ minimizing system may determine adjustments to future workloads predicted to cause high $CO_2$ emissions so as to minimize $CO_2$ emissions across plural data storage system/data center(s) hardware components. The method for predicting an adjustment to a predicted future workload that decreases predicted $CO_2$ emissions below a user-specified $CO_2$ load-balancing threshold value may then end.

FIG. 6 is a flow diagram illustrating a method of displaying for the managing user, via the management terminal, forecasted future memory access function workloads and recommendations for decreasing carbon dioxide ($CO_2$) emissions caused thereby to a managing user of a data storage system/data center(s) according to an embodiment of the present disclosure. As described herein, a graphical user interface (GUI) operating at the data storage system/data center(s) may receive forecasted future workloads and recommendations for adjusting those workloads to decrease $CO_2$ emissions from the UEM platform. For example, such a GUI in various embodiments described herein may display for the managing user, via the management terminal, a predicted workload and resulting carbon footprint forecasted by the time series forecasting engine to occur during an upcoming time window in which the carbon footprint is expected to exceed the user-specified $CO_2$ load-balancing threshold value for the data storage system/data center(s) or one or more hardware components therewithin. As another example, the GUI in embodiments may also display for the managing user, via the management terminal, one or more recommended adjustments to that workload predicted to decrease the carbon footprint forecasted to occur during the upcoming time window below the user-specified $CO_2$ load-balancing threshold value.

At block 602, the GUI at a data storage system/data center(s) may receive predicted power consumption for initial and adjusted forecasted future loads of memory accessing functions and resulting predicted $CO_2$ emissions for one or more hardware components at a data storage system/data center(s). For example, in an embodiment described with respect to FIG. 2, above, the GUI 215 may receive such information from the predictive task adjusting and $CO_2$ minimizing system 280 via the communication agent 281 and the load-balancing agent 216 at the data storage system/data center(s) 210, as described in greater detail with respect to FIG. 4 at blocks 412 and 416. In some embodiments, the GUI 215 of the data storage system/data center(s) 210 may also receive one or more recommendations for adjusting the initial forecasted future load of memory accessing functions and a workload redistribution recommendation for one or more data storage system/data center(s) hardware components (e.g., 231, 232, 240a, 240b, 240c, 240d, 241a, 241b, 242a, 242b, 243a, 243b, 244a, 244b, 211, 212, 250a, 250b, 251, 252, 253 or 254). As described herein, the future forecasted workload may include predicted memory access function executions predicted to be performed by the computing node hardware processors (e.g., 242a, 242b) at the data storage system/data center(s) 210 computing nodes (e.g., 240a or 240b, respectively)

The GUI 215 at the data storage system/data center(s) 210 in an embodiment at block 604 may display for the managing user, via the management terminal 217, a graphical or textual description of a memory access function workload predicted by the time series forecasting engine to cause $CO_2$ emissions exceeding a user-specified $CO_2$ load-balancing threshold value for the data storage system/data center(s) 210 or one or more hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) therewithin. For example, the time series forecasting engine 286 in an embodiment may predict such an initially forecasted future load of memory accessing functions that may cause a future CO2 emissions value that exceeds a user-specified CO2 load-balancing threshold value, as described in greater detail above with respect to FIG. 4 at blocks 408 and 412.

As another example, in an embodiment described with respect to FIG. 3A, the initial forecast GUI 300 may display for the managing user, via the management terminal, the initially forecasted future load of memory accessing functions predicted to cause CO2 emissions exceeding the CO2 load-balancing threshold value. The managing user of the initial forecast GUI 300 in an embodiment may use the drop-down menu 310 to select a computing node, data storage system, array, storage drive, or data center for which the managing user may wish to view the forecasted workload during an upcoming time window. More specifically, the managing user may select via cursor 311 to view the upcoming initially forecasted future load of memory accessing functions for a computing "node A" (e.g., computing node 240*a* of FIG. 2, above) comprising one or more data storage system/data center(s) hardware components (e.g., 241*a*, 242*a*, 243*a*, 244*a*, 245*a*) of FIG. 2, above). The initial forecast GUI 300 in such an example embodiment may indicate to the managing user via the warning dialogue box 351 that the predictive task adjusting and CO2 minimizing system has predicted that the memory accessing workload for a future time window and the user-specified computing node, data storage system, array, storage drive, or data center will cause CO2 emissions above a user-specified CO2 load-balancing threshold value for the data storage system/data center(s) or one or more hardware components therewithin.

The initial forecast GUI 300 in such an embodiment may further describe the initially forecasted future load of memory accessing functions predicted to cause such CO2 emissions by memory maintenance function or by memory access type, for example. This may provide the managing user with a visual depiction of the types of memory access functions predicted to cause CO2 emissions to exceed the user-specified CO2 load-balancing threshold value, and to better understand how planned workloads affect carbon footprint across computing nodes, storage drives, arrays, or data centers. More specifically, the initial forecast GUI 300 may display for the managing user, via the management terminal, initially forecasted read access breakdown chart 320 that describes the percentage of read memory access types initially anticipated to occur using various compression rates or decompression rates. For example, the initially forecasted read access breakdown chart 320 in an embodiment may predict that 50% of the initially forecasted read memory accesses may use a 128K compression rate, 25% of the initially forecasted read memory accesses may use a 64K compression rate, 10% of the initially forecasted read memory accesses may use an 8K compression rate, and 15% of the initially forecasted read memory accesses may use an 8K decompression rate. As described above with respect to FIG. 5, because the largest percentage (50%) of read memory accesses predicted to cause CO2 emissions above the user-specified CO2 load-balancing threshold value are expected to use the 128K compression rate, the CO2 emissions caused by execution of the future workload initially forecasted and described at 300 may be lowered by decreasing the number of these 128K compression read memory access functions. This may also visually inform the managing user or manager of the plurality of data storage system/ data center(s) hardware components upon which such a workload will be executed in the future that 128K compression read memory accesses may be associated with a higher anticipated CO2 emissions value than other compression or decompression rate functions to be executed across a plurality of hardware components at the data storage system/ data center(s).

As another example, the initial forecast GUI 300 may display for the managing user, via the management terminal, initially forecasted write access breakdown chart 330 that describes the percentage of write memory access types initially anticipated to occur using various compression rates or deduplication rates. For example, the initially forecasted write access breakdown chart 330 in an embodiment may predict that 70% of the initially forecasted write memory accesses may use a 128K compression rate, 20% of the initially forecasted write memory accesses may use a 16K compression rate, and 10% of the initially forecasted write memory accesses may use a 128K deduplication rate. As described above with respect to FIG. 5, because the largest percentage (70%) of write memory accesses predicted to cause CO2 emissions above the user-specified CO2 load-balancing threshold value are expected to use the 128K compression rate, the CO2 emissions caused by execution of the future workload initially forecasted and described at 300 may be lowered by decreasing the number of these 128K compression write memory access functions. This may also visually inform the user or manager of the plurality of data storage system/data center(s) hardware components upon which such a workload will be executed in the future that 128K compression write memory accesses may be associated with a higher anticipated CO2 emissions value than other compression or deduplication rate functions to be executed across a plurality of hardware components of the data storage system/data center(s) 210.

As yet another example, the initial forecast GUI 300 may display for the managing user, via the management terminal, initially forecasted memory maintenance function breakdown chart 340 that describes the percentage of memory maintenance functions initially anticipated to occur in the future time window. For example, the initially forecasted memory function breakdown chart 340 in an embodiment may predict that 40% of the initially forecasted memory maintenance functions may comprise snapshot tasks, 30% of the initially forecasted memory maintenance functions may comprise backup tasks, 20% of the initially forecasted memory maintenance functions may comprise replication tasks, and 10% of the initially forecasted memory maintenance functions may comprise encryption tasks. As described above with respect to FIG. 5, because the largest percentage (40%) of memory maintenance functions predicted to cause CO2 emissions above the user-specified CO2 load-balancing threshold value comprise snapshot tasks, the CO2 emissions caused by execution of the future workload initially forecasted and described at 300 may be lowered by decreasing the number or frequency of these snapshot tasks executed during the future time window. This may also visually inform the user or manager of the plurality of data storage system/data center(s) hardware components upon which such a workload will be executed in the future that snapshot tasks may be associated with a higher anticipated CO2 emissions value than other memory maintenance functions.

In another example embodiment described with respect to FIG. 3B, above, an adjusted forecast GUI 360 may display for the managing user, via the management terminal, an adjusted forecasted future load of memory accessing functions predicted to cause a future $CO_2$ emissions value below the $CO_2$ load-balancing threshold value for the same time window described above with respect to FIG. 3A. For example, the information described at FIG. 3B may display for the managing user, via the management terminal, adjusted forecasted future load of memory determined by the time series forecasting engine, as described in greater detail above with respect to FIG. 4 at block 410. This adjusted forecasted future load in an example embodiment may be predicted based on adjustments to the initially forecasted future load of memory accessing functions initially predicted (e.g., as described in greater detail above with respect to FIG. 4 at block 408) to cause $CO_2$ emissions exceeding the user-specified $CO_2$ load-balancing threshold value. These adjustments may be displayed for the managing user, via the management terminal, within the adjusted forecast GUI 360 within the drop-down list 370. The managing user may select (e.g., via cursor 371) one or more recommended adjustments (e.g., shifting the 128K write memory access compression rate to 16K compression rate shown at 372) for one or more hardware components of the data storage system/data center(s).

Upon such a managing user selection, the adjusted forecast GUI 360 in an embodiment may display for the managing user, via the management terminal, the predicted effect of such an adjustment on the forecasted future load of memory accessing functions and upon the $CO_2$ emitted due to such an execution. For example, the adjusted forecast GUI 360 in an embodiment may display via dialogue box 391 that adjusting the future write memory access compression rate from 128K to 16K may result in $CO_2$ emissions falling below the user-specified $CO_2$ load-balancing threshold value. As another example, the adjusted forecast GUI 360 may display for the managing user, via the management terminal, adjusted forecasted write access breakdown chart 380 that describes the percentage of write memory access types adjusted to use compression rates or deduplication rates predicted to decrease the $CO_2$ emissions below the user-specified $CO_2$ load-balancing threshold value. More specifically, the adjusted forecasted write access breakdown chart 380 in an embodiment may predict that adjusting the initially forecasted future load of memory accessing functions such that 90% of the write memory accesses use a 16K compression rate, and 10% of write memory accesses use a 128K deduplication rate may decrease the $CO_2$ emissions for the future workload below the user-specified $CO_2$ load-balancing threshold value, as indicated at box 391.

At block 606, the data storage system/data center(s) management terminal GUI in an embodiment may display a predicted $CO_2$ emissions for initial and adjusted forecasted future load of memory accessing functions for data storage system/data center(s) hardware components by computing node, computing engine, array, storage drive, data storage system, or data center. For example, in an embodiment described with respect to FIG. 3A, the initial forecast GUI 300 in an embodiment may display for the managing user, via the management terminal, an initially forecasted $CO_2$ emissions source breakdown chart 350 that describes the percentage of each emissions source predicted to contribute to the future $CO_2$ emissions predicted to result from execution of the workload described at 320, 330, and 340 and indicated at 351 to exceed the user-specified $CO_2$ load-balancing threshold value for the data storage system/data center(s) or one or more hardware components therewithin.

More specifically, the initially forecasted $CO_2$ emissions source breakdown chart 350 in an embodiment may predict that 60% of the $CO_2$ emissions predicted to result from execution of the initially forecasted future workload and to exceed the user-specified $CO_2$ load-balancing threshold value may comprise $CO_2$ emitted through the burning of coal. As another example, the initially forecasted $CO_2$ emissions source breakdown chart 350 in an embodiment may predict that 20% of the predicted future $CO_2$ emissions may comprise $CO_2$ emitted through the burning of diesel, 10% of the predicted future $CO_2$ emissions may comprise $CO_2$ emitted through the burning of natural gas, and 10% of the predicted future $CO_2$ emissions may comprise $CO_2$ emitted through the generation of hydro-electric power. This may visually inform the user or manager of the plurality of data storage system/data center(s) hardware components upon which such a workload will be executed in the future that any memory accessing function (e.g., read memory access, write memory access, or memory maintenance function) may be associated with higher $CO_2$ emissions during time windows in which the power source supplying power for execution of such costs relies on less environmentally-friendly methods for power generation (e.g., burning of fossil fuels). This may occur, for example, during peak power consumption hours for the power source. In such peak consumption time windows, power sources may resort to the less-prioritized use of power generated through less environmentally friendly methods in order to meet the surge in demand.

In another example embodiment described with respect to FIG. 3B, the adjusted forecast GUI 360 in an embodiment may display for the managing user, via the management terminal, an adjusted forecasted $CO_2$ emissions source breakdown chart 390 that describes the percentage of each emissions source predicted to contribute to the future $CO_2$ emissions predicted to result from execution of the workload described at 380 and indicated at 391 to fall below the user-specified $CO_2$ load-balancing threshold value. More specifically, the adjusted forecasted $CO_2$ emissions source breakdown chart 390 in an embodiment may predict that 50% of the $CO_2$ emissions predicted to result from execution of the adjusted forecasted future workload and to fall below the user-specified $CO_2$ load-balancing threshold value may comprise $CO_2$ emitted through the burning of coal. As another example, the adjusted forecasted $CO_2$ emissions source breakdown chart 390 in an embodiment may predict that 20% of the predicted future $CO_2$ emissions may comprise $CO_2$ emitted through the burning of diesel, 10% of the predicted future $CO_2$ emissions may comprise $CO_2$ emitted through the burning of natural gas, and 20% of the predicted future $CO_2$ emissions may comprise $CO_2$ emitted through the generation of hydro-electric power.

In comparison with the initially forecasted $CO_2$ emissions source breakdown chart (e.g., 350 or FIG. 3A), the adjusted forecasted $CO_2$ emissions source breakdown chart 390 may indicate that shifting from a 128K write memory access compression rate to a 16K compression rate may result in 10% less consumption of power derived from the burning of fossil fuels and 10% more consumption of power derived from hydro-electric sources. This may occur, for example, when the recommended adjustment selected at 372 results in an overall decrease in power drawn from the power source that allows the power source to rely on more environmentally friendly power sources. In other words, if the recommended adjustment made by the predictive task adjusting and $CO_2$ minimizing system decreases the power demand on the power source, the power source may not need to draw power from less environmentally friendly methods (e.g., burning of fossil fuels) to meet increased demand. This may visually inform the user or manager of the plurality of data storage system/data center(s) hardware components upon which such an adjusted workload will be executed in the future that minor adjustments to memory accessing functions (e.g., read memory access, write memory access, or memory maintenance function) may be associated with significant reductions in $CO_2$ emissions during time windows in which the power source supplying power for execution of such costs relies on less environmentally-friendly methods for power generation (e.g., burning of fossil fuels).

The adjusted forecast GUI 360 in an embodiment may receive a managing user selection to accept or reject a recommended adjustment at block 608. For example, the managing user of the data storage system/data center(s) may use a cursor 373 to select a check box beside one or more recommendations 370 made by the predictive task adjusting and $CO_2$ minimizing system to reduce $CO_2$ emissions during an upcoming time window due to operation of various hardware components of the data storage system/data center(s). More specifically, the managing user may select at 373 to accept the recommendation by the predictive task adjusting and $CO_2$ minimizing system to shift the write memory access functions from a 128K compression rate to a 16K compression rate during the upcoming time window in which the time series forecasting engine initially predicted $CO_2$ emissions due to execution of such write memory access functions will exceed the user-specified $CO_2$ load-balancing threshold value (e.g., as described above at block 408 of FIG. 4) for the data storage system/data center(s) or one or more hardware components therewithin. If the adjusted forecast GUI 360 in an embodiment receives a managing user instruction to accept a recommended adjustment, the method may proceed to block 610 for transmission of the managing user instruction to the predictive task adjusting and $CO_2$ minimizing system operating at the Unified Endpoint Management (UEM) platform. If the adjusted forecast GUI 360 in an embodiment does not receive a managing user instruction to accept any of the recommended adjustments, this may indicate the managing user prioritizes the efficiency or importance of executing the memory accessing functions as initially planned and without adjustment over the need to decrease $CO_2$ emissions resulting from such an execution. In such a case, the managing user would have been informed as to the impact of executing each type of memory accessing function predicted to occur in the upcoming time window, and the method for displaying for the managing user, via the management terminal, forecasted future memory access function workloads and recommendations for decreasing $CO_2$ emissions caused thereby may then end.

At block 610, in an embodiment in which the adjusted forecast GUI has received a managing user instruction at a management terminal for the data storage system/data center(s) to accept one or more of the recommendations to adjust the initially forecasted future load of memory accessing functions suggested by the predictive task adjusting and $CO_2$ minimizing system, the load-balancing agent at the data storage system/data center(s) may transmit a managing user instruction to accept the recommended adjustment to the UEM platform. For example, in an embodiment described with respect to FIG. 2, upon managing user selection of one or more recommendations, the GUI (e.g., 215) at the data storage system/data center(s) 210 in an embodiment may transmit acceptance of specifically identified recommendations to the UEM platform 200. In such an embodiment, the predictive task adjusting and $CO_2$ minimizing system 280 operating at the UEM platform 200 may return a workload redistribution instruction (e.g., as identified by the predictive task adjusting and $CO_2$ minimizing system at block 516 in FIG. 5) for execution of the user-selected adjustments at the plurality of data storage system/data center(s) hardware components (e.g., 231, 232, 240a, 240b, 240c, 240d, 241a, 241b, 242a, 242b, 243a, 243b, 244a, 244b, 211, 212, 250a, 250b, 251, 252, 253 or 254) during the upcoming time window.

The load-balancing agent at the data storage system/data center(s) executing the adjusted forecasted future load of memory accessing functions in an embodiment may receive the workload redistribution instruction from the UEM platform at block 612. For example, the load-balancing agent 216 may receive the workload redistribution instructions from the UEM platform 200 for execution at one or more local-to-data storage system computing node hardware processors (e.g., 242a, 242b) at the data storage system/data center(s) 210.

At block 614, the load-balancing module for the data storage system/data center(s) executing the workload redistribution instructions may operate in tandem with a local-to-data storage system hardware processor to execute the workload redistribution instruction. In some cases, this may occur across a plurality of computing nodes or local-to-data storage system (e.g., remote to the UEM 200 platform) hardware processors. For example, the load-balancing module 216 may work in tandem with one or more of the remote (to the UEM 200) hardware processors (242a, 242b) to execute the received workload redistribution instructions for execution of the adjusted forecasted future load of functions for accessing memory 246. In such a way, the predictive task adjusting and $CO_2$ minimizing system, including the time series forecasting engine may preemptively recommend adjustments to workloads expected to cause high carbon footprints during future time windows in order to limit or avoid $CO_2$ emissions values forecasted to exceed a user-specified $CO_2$ load-balancing threshold value for the data storage system/data center(s) or for one or more hardware components therewithin. The method for displaying for the managing user, via the management terminal, forecasted future memory access function workloads and recommendations for decreasing $CO_2$ emissions caused thereby may then end.

The blocks of the flow diagrams of FIGS. 4, 5, and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing a predictive task adjusting and carbon dioxide (CO2) minimizing system comprising:

a network interface device to receive operational telemetry measurements for a first hardware component that executes memory accessing functions within a data center, including power analytics, a load of the memory accessing functions identified for a memory maintenance function with a memory access type, a geographic location, and a determined CO2 emissions value, wherein the memory access type includes the memory accessing functions selected from a read memory access type, a write memory access type, and a memory maintenance type;

a local hardware processor executing code instructions of a time series forecasting engine modeling a relationship between changes in CO2 emissions values and changes in the operational telemetry measurements for the first hardware component that executes the memory accessing functions within the data center, to predict a future CO2 emissions value for the first hardware component within a future time window that exceeds a CO2 load-balancing threshold value determined for thate first hardware component where changes in CO2 emissions are due to a forecasted future load of the memory accessing functions causing a change in energy consumption at that first hardware component;

the local hardware processor executing code instructions of the predictive task adjusting and CO2 minimizing system to identify an adjusted forecasted future load of the memory accessing functions due to decreasing read compression rate or read decompression rate for the read memory access type, due to decreasing write compression rate or write deduplication rate for the write memory access type, or due to decreasing frequency of execution of the high-power consumption memory maintenance functions for the memory maintenance access type to cause a predicted decrease in CO2 emitted due to execution of the adjusted forecasted future load of the memory accessing functions during the future time window relative to the CO2 load-balancing threshold; and the network interface device to transmit a workload redistribution instruction for implementing the adjusted forecasted future load of the memory accessing functions at a remote hardware processor of a second hardware component of the data center instead of the first hardware component when the adjusted forecasted future load of the memory accessing functions during the future time window are still above the CO2 load-balancing threshold.

2. The information handling system of claim 1, wherein the workload redistribution instructions limits the read compression rate or the write compression rate in the adjusted forecasted future load of the memory accessing functions executing at the second hardware component of the data center.

3. The information handling system of claim 1, wherein the workload redistribution instructions limits the read decompression rate in the adjusted forecasted future load of memory accessing functions executing at the second hardware component of the data center.

4. The information handling system of claim 1, wherein the workload redistribution instructions limits the write deduplication rate in the adjusted forecasted future load of the memory accessing functions executing at the hardware component of the data center.

5. The information handling system of claim 1, wherein the workload redistribution instructions limits an execution frequency for the high-power consumption memory maintenance function in the adjusted forecasted future load of the memory accessing functions executing at the second hardware component of the data center.

6. The information handling system of claim 1 further comprising:

the local hardware processor executing code instructions to identify a first high-power consumption memory maintenance function in the forecasted future load of the memory accessing functions that is predicted to cause a largest percentage of the future CO2 emissions value relative to other memory maintenance functions in the forecasted future load of memory accessing functions, and identify the adjusted forecasted future load of the memory accessing functions based on adjustment to limit an execution frequency of the first high-powered consumption memory maintenance function.

7. The information handling system of claim 1 further comprising:

the local hardware processor executing code instructions to identify a first memory access type selected from the read memory access type, the write memory access type, and the memory maintenance type in the forecasted future load of the memory accessing functions that is predicted to cause a largest percentage of the future CO2 emissions value relative to other memory accessing functions of the other memory access types in the forecasted future load of the memory accessing functions, and identify the adjusted forecasted future load of memory accessing functions based on adjustment of the first memory access type.

8. A method for predictive memory access function task adjustment to minimize carbon dioxide (CO2) emissions executing on an information handling system comprising:

receiving, via a network interface device, operational telemetry measurements for a hardware component that executes memory accessing functions within a data storage system-, including power analytics, a load of the memory accessing functions each identified with a memory access type, a geographic location, and a determined CO2 emissions value, wherein the memory access type includes the memory accessing functions selected from a read memory access type, a write memory access type, and a memory maintenance type;

predicting, via a local hardware processor executing a time series forecasting engine modeling a relationship between changes in CO2 emissions values and changes in the operational telemetry measurements for a first hardware component that executes memory accessing functions within the data storage system, a future CO2 emissions value for the first hardware component within a future time window that exceeds a $CO_2$ load-balancing threshold value determined for the hardware component, where changes in $CO_2$ emissions are due to a forecasted future load of the memory accessing functions;

identifying a first memory maintenance function in the forecasted future load of the memory accessing functions, via the local hardware processor executing a predictive task adjusting and $CO_2$ minimizing system, that is predicted to cause a largest percentage of the future $CO_2$ emissions value relative to other memory accessing functions in the forecasted future load of the memory accessing functions;

determining an adjusted forecasted future load of the memory accessing functions, based on an adjustment of the first memory maintenance function with decreasing frequency of execution of the first memory maintenance function that is of the memory maintenance access type and, that is predicted to decrease $CO_2$ emitted due to execution of the adjusted forecasted future load of the memory accessing functions during the future time window below the $CO_2$ load-balancing threshold;

transmitting, via the network interface device, a workload redistribution instruction for implementing the adjusted forecasted future load of memory accessing functions to adjust the first memory maintenance function at the first hardware resource of the data storage system by decreasing the frequency of execution of the first memory maintenance function; and transmitting, via the network interface device, a workload redistribution instruction for implementing the adjusted forecasted future load of memory accessing functions to adjust the first memory maintenance function at a second hardware resource having a remote hardware processor of the data storage system when the predicted decrease in $CO_2$ emitted due to execution of the adjusted forecasted future load of the memory accessing functions during the future time window does not fall below the $CO_2$ load-balancing threshold.

9. The method of claim 8 further comprising:

identifying, via the local hardware processor, a first memory access type selected from the read memory access type of the write memory access type in the forecasted future load of memory accessing functions that is predicted to cause a largest percentage of the future $CO_2$ emissions value relative to other memory access types in the forecasted future load of memory accessing functions, and identify the adjusted forecasted future load of memory accessing functions based on adjustment of the first memory access type by decreasing read compression rate or read decompression rate for the read memory access type, or by decreasing write compression rate or write deduplication rate for the write memory access type.

10. The method of claim 8, wherein the workload redistribution instructions specify an encryption scheme for the first memory maintenance function in the adjusted forecasted future load of the memory accessing functions executing at the first hardware component of the data storage system.

11. The method of claim 8, wherein the adjustment to the first memory maintenance function includes decreasing the frequency of execution of memory backup functions executing at the hardware component of the data storage system.

12. The method of claim 8, wherein the adjustment to the first memory maintenance function includes decreasing the frequency of execution of memory encryption functions executing at the hardware component of the data storage system.

13. The method of claim 8, wherein the adjustment to the first memory maintenance function includes decreasing the frequency of execution of memory snapshot functions executing at the hardware component of the data storage system.

14. The method of claim 8, wherein the adjustment to the first memory maintenance function includes decreasing the frequency of execution of memory replication functions executing at the hardware component of the data storage system.

15. An information handling system executing a predictive task adjusting and carbon dioxide ($CO_2$) minimizing system comprising:

a network interface device to receive operational telemetry measurements for a hardware component that executes memory accessing functions within a data storage system, including power analytics, a load of the memory accessing functions identified by a memory maintenance function and a memory access type, a data storage system geographic location, and a determined $CO_2$ emissions value for a first hardware component of the data storage system, wherein the memory access type includes the memory accessing functions selected from a read memory access type, a write memory access type, and a memory maintenance type;

a local hardware processor executing code instructions of a time series forecasting engine modeling a relationship between changes in $CO_2$ emissions values and changes in the operational telemetry measurements for the first hardware component that executes the memory accessing functions within the data storage system to predict a future $CO_2$ emissions value for the first hardware component within a future time window;

the local hardware processor determining that the predicted future $CO_2$ emissions value exceeds a $CO_2$ load-balancing threshold value determined for the first hardware component due to a forecasted future load of the memory accessing functions;

the local hardware processor executing code instructions of the predictive task adjusting and $CO_2$ minimizing system to identify a first memory access type in the forecasted future load of the memory accessing functions that is predicted to cause a largest percentage of the future $CO_2$ emissions value relative to other memory access types in the forecasted future load of the memory accessing functions;

the local hardware processor executing code instructions of the predictive task adjusting and $CO_2$ minimizing system to determine an adjusted forecasted future load of the memory accessing functions based on adjustment of the first memory access type that is predicted to decrease $CO_2$ emitted due to execution of the adjusted forecasted future load of the memory accessing functions during the future time window below the $CO_2$ load-balancing threshold, wherein the adjustment of the first memory type includes decreasing read compression rate or read decompression rate for the read memory access type, decreasing write compression rate or write deduplication rate for the write memory access type, or decreasing frequency of execution high-power consumption memory maintenance functions for the memory maintenance access type; and the network interface device to transmit a workload redistribution instruction for implementing the adjusted forecasted future load of memory accessing functions to adjust the first memory access type at the first hardware component of the data storage system according to the adjustment of the first memory type having the predicted decrease $CO_2$ emitted below the $CO_2$ load-balancing threshold.

16. The information handling system of claim 15 further comprising:

the local hardware processor executing code instructions to identify a first high-power consumption memory maintenance function as the first memory access type in the forecasted future load of the memory accessing functions that is predicted to cause a largest percentage of the future $CO_2$ emissions value relative to other memory maintenance functions in the forecasted future load of the memory accessing functions, and determine the adjusted forecasted future load of the memory accessing functions based on adjustment of decreasing the frequency of execution of the first high-power consumption memory maintenance function.

17. The information handling system of claim 15, wherein the adjustment of the first memory access type includes decreasing of the read compression rate for memory reads executing at the first hardware component of the data storage system.

18. The information handling system of claim 15, wherein the adjustment of the first memory access type includes decreasing the write compression rate for memory writes executing at the first hardware component of the data storage system.

19. The information handling system of claim 15, wherein the adjustment of the first memory access type includes decreasing the write deduplication rate for memory writes executing at the first hardware component of the data storage system.

20. The information handling system of claim 15, wherein the adjustment of the first memory access type includes decreasing the read decompression rate for memory reads executing at the first hardware component of the data storage system.

\* \* \* \* \*